(12) United States Patent
Sze

(10) Patent No.: US 11,821,537 B2
(45) Date of Patent: Nov. 21, 2023

(54) ELECTRO-MECHANICAL VALVE SERVO APPARATUS FOR TOOL-FREE RETROFIT INSTALLATION

(71) Applicant: Chun Kuen Sze, Hong Kong (HK)

(72) Inventor: Chun Kuen Sze, Hong Kong (HK)

(*) Notice: Subject to any disclaimer, the term of this patent is extended or adjusted under 35 U.S.C. 154(b) by 397 days.

(21) Appl. No.: 17/184,570

(22) Filed: Feb. 24, 2021

(65) Prior Publication Data

US 2021/0180714 A1 Jun. 17, 2021

Related U.S. Application Data

(63) Continuation-in-part of application No. 17/037,886, filed on Sep. 30, 2020, now Pat. No. 10,995,876, which is a continuation-in-part of application No. PCT/CN2019/107058, filed on Sep. 20, 2019.

(30) Foreign Application Priority Data

Jun. 12, 2019 (CN) .......................... 201910505506.0

(51) Int. Cl.
*F16K 31/05* (2006.01)
*B25J 15/00* (2006.01)

(52) U.S. Cl.
CPC ......... *F16K 31/055* (2013.01); *B25J 15/0028* (2013.01); *B25J 15/0066* (2013.01)

(58) Field of Classification Search
CPC .. F16K 31/055; B25J 15/0028; B25J 15/0066
See application file for complete search history.

(56) References Cited

U.S. PATENT DOCUMENTS

| 10,995,876 B2* | 5/2021 | Sze .......................... B25J 15/02 |
| 2006/0124171 A1 | 6/2006 | Ghazarian et al. |
| 2018/0112376 A1 | 4/2018 | Beger et al. |

FOREIGN PATENT DOCUMENTS

CN 206748458 U 12/2017

OTHER PUBLICATIONS

MTandiZ: "Guardian Elexa Leak Flood Prevention System Valve Controller", YouTube video, Mar. 5, 2018, Retrieved from the Internet on Jun. 15, 2021: https://www.youtube.com/watch?v=cVCOcM8U_us.
Search Report of Counterpart European Patent Application No. 19922224.1 dated Jun. 28, 2021.

(Continued)

*Primary Examiner* — Stephen A Vu

(57) ABSTRACT

A valve robot hand includes a driving device, a transmitting sleeve, a first return spring, a first centering sleeve configured to sleeve on a screw cap of a valve handle, a driving fork configured to couple with the valve handle, and a ring-like stopper. The driving fork is provided on an outer face of a lower end portion of the transmitting sleeve. The ring-like stopper is mounted on an inner face of the lower end portion of the transmitting sleeve. The ring-like stopper defines a first through-hole configured to sleeve on the screw cap of the valve handle. The ring-like stopper is sleeved on the first centering sleeve through the first through-hole such that the first centering sleeve is capable of moving in the transmitting sleeve along its axial direction. The first return spring is configured to exert a downward elastic force on the first centering sleeve.

17 Claims, 16 Drawing Sheets

(56) References Cited

OTHER PUBLICATIONS

Examination Report of Counterpart European Patent Application No. 19922224.1 dated Jul. 9, 2021.
Elexa Consumer Products Inc.: "The Guardian Valve Controller", Jan. 1, 2018.

* cited by examiner

ELECTRO-MECHANICAL VALVE SERVO APPARATUS FOR TOOL-FREE RETROFIT INSTALLATION

CROSS REFERENCE TO RELATED APPLICATIONS

This application is a continuation-in-part of U.S. patent application Ser. No. 17/037,886 filed on Sep. 30, 2020, which is a continuation-in-part of PCT Application No. PCT/CN2019/107058 filed on Sep. 20, 2019, which claims priority of Chinese patent application No. 201910505506.0 filed at the China National Intellectual Property Administration on Jun. 12, 2019, and entitled "Valve Robot Hand". The contents of the applications are incorporated herein by reference in their entireties.

TECHNICAL FIELD

The present application relates to the field of valve control technology, and particularly relates to an electro mechanic valve servo apparatus, or a valve robot hand.

BACKGROUND TECHNOLOGY

A valve robot hand is a machinery that controls the opening and closing of a fluid ball valve for domestic and industrial use. However, existing valve robot hands cannot adapt to ball valves of different specifications. Furthermore, existing valve actuator is mounted on a pipe by a metal hoop ring hose clamp located at only one side of the valve, and counter force from the valve will cause loosening and shifting of the clamp and will eventually lead to malfunctioning of the valve actuator because the valve actuator is no longer aligned properly with the valve for normal operation.

SUMMARY OF THE APPLICATION

The present application provides an electro mechanic valve servo apparatus or a valve robot hand. The valve robot hand can adapt to ball valves of at least two types of specifications and more.

In a first aspect, a valve robot hand is provided and includes a driving device, a transmitting sleeve, a first return spring, a first centering sleeve configured to sleeve on a screw cap of a valve handle, a driving fork configured to couple with the valve handle, and a ring-like stopper. The driving fork is provided on an outer face of a lower end portion of the transmitting sleeve. The ring-like stopper is mounted on an inner face of the lower end portion of the transmitting sleeve. The ring-like stopper defines a first through-hole configured to sleeve on the screw cap of the valve handle. The ring-like stopper is sleeved on the first centering sleeve through the first through-hole such that the first centering sleeve is capable of moving in the transmitting sleeve along its axial direction. The first return spring is configured to exert a downward elastic force on the first centering sleeve. The driving device is in transmission connection with an upper end of the transmitting sleeve, so as to drive the transmitting sleeve and the driving fork to rotate. A lower end face of the first centering sleeve is in flush with a lower end face of the ring-like stopper.

Optionally, in a possible way of implementation, the driving fork is integrally formed with the transmitting sleeve.

Optionally, in a possible way of implementation, the transmitting sleeve, the first centering sleeve, the first return spring, and the ring-like stopper have a cross sectional shape of a circle, square, rectangle, pentagon, hexagon, octagon, or other polygons.

In the above-mentioned scheme, the valve robot hand is provided and configured to control the opening and closing of an existing ball valve. The valve robot hand is mounted on an existing pipe with the ball valve. The driving device maintains a fixed position relationship with the pipe. The driving fork is coupled with the handle of the ball valve. The driving fork rotates through the input power of the driving device and the transmitting sleeve, so that the driving fork can move the handle of the valve. Among them, in order to make the valve robot hand adaptable to a variety of ball valves (The applicant finds out that ball valves of different specifications bring the valve robot hand with difficulty in that the screw caps of the installed handles have different dimensions. If it is required to reliably drive the handle to rotate, the rotating axis of the driving fork needs to be aligned with the rotating axis of the handle. That is, the applicant finds out that if a good control effect is required, the valve robot hand needs to adapt to screw caps of different dimensions, and at the same time the rotating axis of the output of the valve robot hand is aligned with the rotating axis of the handle). In addition, the ring-like stopper defines a first through-hole that can adapt to the screw cap (for a clear distinction, it is identified here as the first screw cap). In order to adapt to (sleeve on) a screw cap of another dimension (i.e., adapt to a ball valve of another dimension, and, for a clear distinction, it identified here as the second screw cap), the present application also includes a first centering sleeve. The first centering sleeve can adapt to (sleeve on) another screw cap. Since the first centering sleeve and the ring-like stopper are in a sleeving relationship, this can allow the first centering sleeve to move axially in the first through-hole and in the transmitting sleeve. Through the effect of first return spring on the first centering sleeve, the first centering sleeve can steadily sleeve on the second screw cap under the effect of the elastic force when adapting to the second screw cap. When adapting to the first screw cap, the first centering sleeve can overcome the elastic force of the first return spring and slide upwards under the effect of abutment of the first screw cap. This ensures that the first through-hole defined by the ring-like stopper can sleeve on the first screw cap. At the same time, since the first through-hole and transmitting sleeve are coaxial, and the first centering sleeve and the first through-hole are coaxial, this ensures that the rotating axis of the power output of the valve robot hand can be coaxial with the rotating axis of the handle.

In the above-mentioned scheme, it provides a possible realization of the first centering sleeve and the ring-like stopper in an unoperated state, wherein the above design allows protection of the first centering sleeve and the first return spring connected to it. At the same time, when adapting to a screw cap of another dimension (such as the above-mentioned second screw cap), the first centering sleeve can be quickly sleeved on the screw cap, improving the efficiency of the installation of the valve robot hand on the ball valve.

Optionally, in a possible way of implementation, a first position-limiting step is formed on an outer face of the first centering sleeve. The first position-limiting step is configured to abut on an upper surface of the ring-like stopper so as to limit the first centering sleeve from detaching downward from the transmitting sleeve.

In the above-mentioned scheme, it provides a design scheme that can limit the moving path of the first centering sleeve. A first position-limiting step is formed on an outer face of the first centering sleeve, so that the first centering sleeve leans on an upper surface of the ring-like stopper (annular blocking portion) under action of the elastic force of the first return spring, thereby ensuring normal operation of the first centering sleeve.

In a second aspect, a valve robot hand is provided and includes a driving device, a transmitting sleeve, a first return spring, a first centering sleeve configured to sleeve on a screw cap of a valve handle, a driving fork configured to couple with the valve handle, and a ring-like stopper. The driving fork is provided on an outer face of a lower end portion of the transmitting sleeve. The ring-like stopper is mounted on an inner face of the lower end portion of the transmitting sleeve. The ring-like stopper defines a first through-hole configured to sleeve on the screw cap of the valve handle. The ring-like stopper is sleeved on the first centering sleeve through the first through-hole such that the first centering sleeve is capable of moving in the transmitting sleeve along its axial direction. The first return spring is configured to exert a downward elastic force on the first centering sleeve. The driving device is in transmission connection with an upper end of the transmitting sleeve, so as to drive the transmitting sleeve and the driving fork to rotate. The valve robot hand further includes a second return spring and a second centering sleeve configured to sleeve on the screw cap of the valve handle. The first centering sleeve is sleeved on the second centering sleeve so that the second centering sleeve can move in the first centering sleeve along its axial direction. The second return spring is configured to exert a downward elastic force on the second centering sleeve.

In the above-mentioned scheme, the valve robot hand can also adapt to screw caps of another dimension, wherein the second centering sleeve is configured to sleeve on another type of screw cap (wherein, in order to clearly describe and to follow the above description, the screw cap to be sleeved on by the second centering sleeves is the third screw cap). Among them, the second centering sleeve can slide in the first centering sleeve. At the same time, the first centering sleeve, the transmitting sleeve, and the ring-like stopper are coaxially disposed. Due to the presence of the second return spring, it allows the driving fork and the first centering sleeve to be able to properly sleeve on screw caps of different dimensions, while also ensuring normal operation of the second centering sleeve.

Optionally, in a possible way of implementation, the driving fork is integrally formed with the transmitting sleeve.

Optionally, in a possible way of implementation, the transmitting sleeve, the first centering sleeve, the second centering sleeve, the first return spring, the second return spring, and the ring-like stopper have a cross sectional shape of a circle, square, rectangle, pentagon, hexagon, octagon, or other polygons.

Optionally, the first centering sleeve, the second centering sleeve, the transmitting sleeve, and the ring-like stopper are coaxially disposed.

Optionally, in a possible way of implementation, a second position-limiting step is formed on an outer face of the second centering sleeve. The second position-limiting step is configured to abut on the first centering sleeve so as to limit the second centering sleeve from detaching downward from the first centering sleeve.

Optionally, in a possible way of implementation, an annular groove is provided on an inner wall of an upper end of the first centering sleeve. The groove is capable of leaning against and cooperating with the second position-limiting step so that the second centering sleeve is capable of abutting on the first centering sleeve.

In the above-mentioned scheme, it provides a structure that can realize the limitation of the moving path of the second centering sleeve. The structure is simple, effective and easy to manufacture, while ensuring normal operation of the second centering sleeve.

Optionally, in a possible way of implementation, a third position-limiting step is formed on an inner face of the transmitting sleeve. An upper end of the first return spring abuts against the third position-limiting step. A lower end of the first return spring abuts against an upper end face of the first centering sleeve. An upper end of the second return spring abuts against the third position-limiting step. A lower end of the second return spring abuts against an upper end face of the second centering sleeve.

In the above-mentioned scheme, it provides a possible way of installing the first return spring and second return spring. Through the third position-limiting step provided in the transmitting sleeve, the first return spring and the second return spring respectively abut between the third position-limiting step and the first centering sleeve as well as the second centering sleeve. It is simple in structure, easy to manufacture and easy to promote. Moreover, due to the reasons of abutment, it is also easy to assemble and can save manufacturing costs.

Optionally, in a possible way of implementation, the valve robot hand further includes a transmitting shaft and a third return spring. An upper end of the transmitting sleeve is sleeved on the transmitting shaft and is connected with the transmitting shaft by a key. The transmitting shaft is connected with an output end of the driving device. The third return spring is disposed between the transmitting sleeve and the driving device and is configured to exert a downward elastic force on the transmitting sleeve.

Optionally, in a possible way of implementation, a through-hole is provided on an upper end face of the transmitting shaft. An output shaft of the driving device is inserted into the through-hole so that it is in transmission connection with the transmitting shaft. The transmitting shaft and the output shaft of the driving device are coaxially disposed.

In the above-mentioned scheme, the transmitting sleeve is connected with the transmitting shaft by a key, so that the transmitting sleeve can slide in an axial direction relative to the transmitting shaft. When the valve robot hand is adapting to ball valves of different heights, screw caps of the ball valves of different heights can lean against the transmitting sleeve, allowing the transmitting sleeve to shift upward in an axial direction. Moreover, due to the elastic force of the third return spring, the transmitting sleeve can always abut on the upper surface of the screw cap, ensuring the stability of the transmitting sleeve as well as the coaxiality of the screw cap.

Optionally, in a possible way of implementation, the driving device includes a motor, a decelerator and a case body. The motor and the decelerator are arranged in the case body. An output end of the motor is connected with an input end of the decelerator. An output end of the decelerator extends out of the case body and connects with the transmitting shaft. The third return spring is sleeved on the transmitting sleeve. An upper end of the third return spring is abutted against the case body. A lower end of the third return spring is abutted against the transmitting sleeve.

Optionally, in a possible way of implementation, an outer wall of the transmitting sleeve is provided with a radially recessed step, and the step is capable of abutting against the third return spring.

In a third aspect, a valve robot hand is provided and includes a driving device, a transmitting sleeve, a first return spring, a first centering sleeve configured to sleeve on a screw cap of a valve handle, a driving fork configured to couple with the valve handle, and a ring-like stopper. The driving fork is provided on an outer face of a lower end portion of the transmitting sleeve. The ring-like stopper is mounted on an inner face of the lower end portion of the transmitting sleeve. The ring-like stopper defines a first through-hole configured to sleeve on the screw cap of the valve handle. The ring-like stopper is sleeved on the first centering sleeve through the first through-hole such that the first centering sleeve is capable of moving in the transmitting sleeve along its axial direction. The first return spring is configured to exert a downward elastic force on the first centering sleeve. The driving device is in transmission connection with an upper end of the transmitting sleeve, so as to drive the transmitting sleeve and the driving fork to rotate. The valve robot hand further includes a clamping mechanism which is configured to be fixed on a pipe. The clamping mechanism is fixedly connected to the driving device. The clamping mechanism includes two grippers. The gripper includes a first clamping piece, a second clamping piece, and an adjusting screw rod. An upper end of the first clamping piece is provided with a hinge portion extending towards the second clamping piece. The hinge portion is hinged with an upper end of the second clamping piece. The first clamping piece and the second clamping piece together define a clamping space. An upper section of the first clamping piece is provided with a first screw hole, and an upper section of the second clamping piece is provided with a second screw hole. The adjusting screw rod is in screw cooperation with the first screw hole and the second screw hole. The upper end faces of the two first clamping pieces together secure the driving device.

In the above-mentioned scheme, it provides a possible way of implementation of fixing the driving device to the pipe by a clamping mechanism, so that the driving device can maintain a relative position relationship with the pipe, thereby enabling the valve robot hand to stably couple with the ball valve. The clamping mechanism includes two grippers. The driving device is fixed on two sides of the pipe through the two grippers, so that the driving device is steadily secured.

Optionally, in a possible way of implementation, the driving fork is integrally formed with the transmitting sleeve.

Optionally, in a possible way of implementation, the transmitting sleeve, the first centering sleeve, the first return spring, and the ring-like stopper have a cross sectional shape of a circle, square, rectangle, pentagon, hexagon, octagon, or other polygons.

Optionally, in a possible way of implementation, the gripper further includes a first assembly rod and a second assembly rod, a center of the first assembly rod is provided with a first screw hole, a center of the second assembly rod is provided with a second screw hole.

The first assembly rod is provided through the upper section of the first clamping piece. An outer wall of the first clamping piece is provided with a through-hole. The first screw hole is exposed to the through-hole of the first clamping piece. The second assembly rod is provided through the upper section of the second clamping piece. An outer wall of the second clamping piece is provided with a through-hole. The second screw hole is exposed to the through-hole of the second clamping piece.

A front section of the adjusting screw rod is formed into a first thread. A rear section of the adjusting screw rod is formed into a second thread. A diameter of the first thread is smaller than a diameter of the second thread. The first thread and the second thread are left-handed thread and right-handed thread.

In the above-mentioned scheme, it provides a specific structure of a gripper that can realized. Through the first assembly rod and the second assembly rod, the first screw hole and the second screw hole in the gripper are conveniently and simply realized, thereby effectively improving the efficiency of manufacturing and reducing the difficulty of manufacturing. Moreover, due to the application of left-handed and right-handed threads, it allows the adjusting screw rod to quickly cooperate with the first screw hole and the second screw hole. This reduces the clamping and releasing time of the first clamping piece and the second clamping piece of the gripper.

Optionally, in a possible way of implementation, the gripper further includes a hinge rod. The first clamping piece and the second clamping piece are assembled through the hinge rod.

Among them, the hinge portion of the first clamping piece is provided with a through-hole, and the upper end of the second clamping piece is also provided with a through-hole. The hinge rod is inserted into the through-hole at the hinge portion of the first clamping piece and the through-hole at the upper end of the second clamping piece.

Optionally, in a possible way of implementation, the valve robot hand further includes a clamping mechanism. The clamping mechanism is configured to be fixed on a pipe, and the clamping mechanism is connected with the driving device through a snap portion.

The snap portion is provided with a sliding element. The sliding element of the snap portion is so configured that the clamping mechanism is capable of sliding relative to the driving device.

Optionally, the clamping mechanism includes two grippers. The two grippers are correspondingly provided with two snap portions. The two grippers are capable of sliding relative to the driving device through the sliding elements of the snap portions so that the two grippers move towards each other or in opposite directions.

BRIEF DESCRIPTION OF THE DRAWINGS

In order to more clearly explain the technical scheme of the embodiments of the present application, the following is a brief introduction of the drawings needed to be used in the embodiments. It should be understood that the following drawings only show some of the embodiments of this application, and therefore should not be regarded as a limit to the scope. For an ordinary technical person in the art, under the premise of no contribution of creative labor, other relevant drawings can also be obtained from these drawings.

Figure 1:
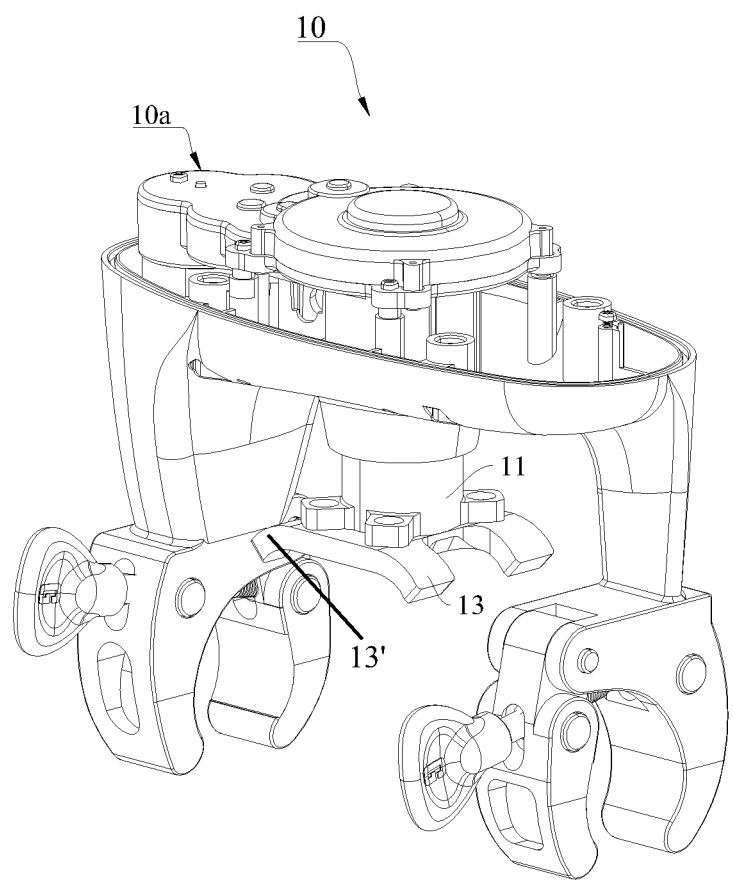
FIG. 1 is a structural schematic view, in a first perspective, of a first embodiment of a valve robot hand of the present application.

Symbols: 10-valve robot hand; 10a-driving device; 10b-gripper; 11-transmitting sleeve; 11a-annular top cover; 12-first centering sleeve; 13-driving fork; 14-second centering sleeve; 15-transmitting shaft; 16-screw cap; 17-valve handle; 21-first return spring; 22-second return spring; 23-third return spring; 24-ring-like stopper; 110-third position-limiting step; 120-first position-limiting step; 140-second position-limiting step; 10a1-motor; 10a2-decelerator; 10a3-case body; 10b1-first clamping piece; 10b2-second clamping piece; 10b3-adjusting screw rod; 10b4-first assembly rod; 10b5-second assembly rod; 10b6-hinge rod; 30-snap portion.

DETAILED DESCRIPTION OF THE EMBODIMENTS

In order to make the purpose, technical scheme and advantages of the embodiments of the present application clearer, the technical schemes of the embodiments of the present application will be described clearly and completely in conjunction with the drawings. Obviously, the described embodiments are merely part of embodiments of the present invention, rather than all of the embodiments. The components of the embodiments of the present application, which are typically described and shown in the drawings here, can be arranged and designed in a variety of configurations.

It should be noted that, in the absence of conflict, the embodiments in the present application and the features in the embodiments can be combined with each other.

The technical schemes in the present application will be described in conjunction with the drawings.

FIGS. 1-8 show a first embodiment of an electro mechanic valve servo apparatus or valve robot hand 10 of the present application. The valve robot hand 10 can adapt to ball valves of a variety of dimensions. It can make the rotating axis of the power output of the valve robot hand 10 to be lying on the same straight line as the rotating axis of a ball valve handle.

Figure 2:
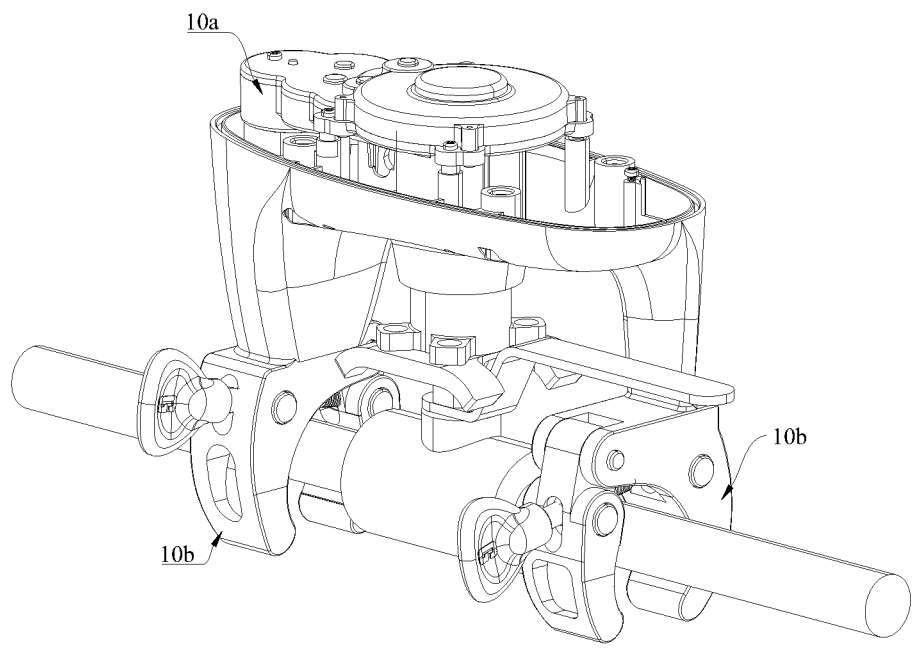
FIG. 2 is a structural schematic view, in a second perspective, of the first embodiment of the valve robot hand of the present application.
Figure 3:
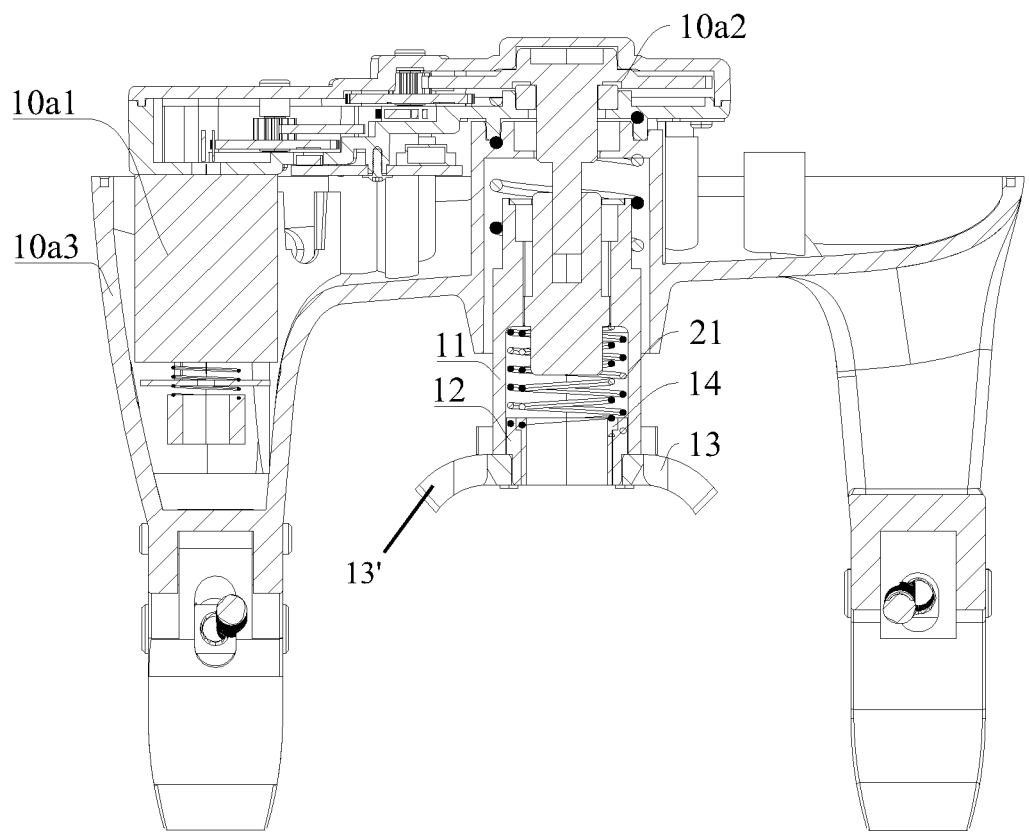
FIG. 3 is a structural schematic view, in a third perspective, of the first embodiment of the valve robot hand of the present application.

Referring to FIG. 1, FIG. 2, and FIG. 3, FIG. 1 shows a specific structure of the valve robot hand 10 in a first perspective, FIG. 2 shows a specific structure of the valve robot hand 10 in a second perspective, and FIG. 3 shows a specific structure of the valve robot hand 10 in a third perspective.

Among them, FIG. 2 shows an application scenario diagram of the valve robot hand 10 of the first embodiment. It can be seen from FIG. 2 that the valve robot hand 10 is secured to a pipe, which includes a ball valve. The valve robot hand 10 is configured to control the rotation of the handle of the ball valve.

It can be seen from FIG. 1, FIG. 2 and FIG. 3 that the valve robot hand 10 includes a driving device 10a, a transmitting sleeve 11, a first return spring 21, a first centering sleeve 12 configured to sleeve on a screw cap 16 of a valve handle 17 (refer to FIG. 16 as mentioned later), and two driving forks 13, 13' provided respectively on two opposite sides of the transmitting sleeve 11 and configured to couple with the valve handle.

A lower end of the transmitting sleeve 11 is connected with the driving forks 13, 13'. The driving forks 13, 13' are provided with a first through-hole (the through-hole structure can be seen in FIG. 3) which is configured to sleeve on a screw cap 16 of the valve handle 17. The first through-hole is coaxial with the transmitting sleeve 11. The driving forks 13, 13' are sleeved on the first centering sleeve 12 through the first through-hole such that the first centering sleeve 12 is capable of moving in the transmitting sleeve 11 along its axial direction. The first return spring 21 is configured to exert a downward elastic force on the first centering sleeve 12. The driving device 10a is in transmission connection with an upper end of the transmitting sleeve 11 so as to drive the driving forks 13, 13' to rotate through the transmitting sleeve 11.

Among them, the valve robot hand 10 is configured to control the opening and closing of an existing ball valve. The valve robot hand 10 can be installed on a pipe and engaged with the existing ball valve without using any tools such that the existing ball valve on the pipe can be easily retrofitted. The driving device 10a maintains a fixed position relationship with the pipe. As shown in FIG. 2, the driving fork 13 is coupled with the handle of the ball valve. The driving fork 13 rotates through the input power of the driving device 10a and the transmitting sleeve 11, so that the driving fork 13 can move the handle of the valve. Among them, in order to make the valve robot hand 10 adaptable to a variety of ball valves (The applicant finds out that ball valves of different specifications bring the valve robot hand 10 with difficulty in that the screw caps of the installed handles have different dimensions. If it is required to reliably drive the handle to rotate, the rotating axis of the driving fork 13 needs to be aligned with the rotating axis of the handle. That is, the applicant finds out that if a good control effect is required, the valve robot hand 10 needs to adapt to screw caps of different dimensions, and at the same time the rotating axis of the output of the valve robot hand 10 is aligned with the rotating axis of the handle), in addition to the role of coupling with the handle, the driving fork 13 of the present application has a first through-hole that can adapt to the screw cap (for a clear distinction, it is identified here as the first screw cap). In order to adapt to (sleeve on) a screw cap of another dimension (i.e., adapt to a ball valve of another dimension, and, for a clear distinction, it identified here as the second screw cap), the present application also includes a first centering sleeve 12. The first centering sleeve 12 can adapt to (sleeve on) another screw cap. Since the first centering sleeve 12 and the driving fork 13 are in a sleeving relationship, this can allow the first centering sleeve 12 to move axially in the first through-hole and in the transmitting sleeve 11. Through the effect of the first return spring 21 on the first centering sleeve 12, the first centering sleeve 12 can steadily sleeve on the second screw cap under the effect of the spring force when adapting to the second screw cap. When adapting to the first screw cap, the first centering sleeve 12 can overcome the spring force of the first return spring 21 and slide upwards under the effect of abutment of the first screw cap. This ensures that the first through-hole of the driving fork 13 can sleeve on the first screw cap. At the same time, since the first through-hole and transmitting sleeve 11 are coaxial, and the first centering sleeve 12 and the first through-hole are coaxial, this ensures that the rotating axis of the power output of the valve robot hand 10 is coaxial with the rotating axis of the handle.

Among them, it should be noted that the above-mentioned driving fork 13 being coupled with the ball valve handle means that the driving fork 13 can engage with the handle of the ball valve, so that the driving fork 13 can drive the ball valve handle to rotate under the rotation of the transmitting sleeve 11. At the same time, the rotation angle of the ball valve handle is the same as the rotation angle of the driving fork 13.

At the same time, it should be noted that, in the present embodiment as shown in FIG. 1, the driving forks 13, 13' are fixed on the transmitting sleeve 11 by bolts. The surface of the driving forks 13, 13' is provided with screw holes. An outer wall of the transmitting sleeve 11 is extended to form mounting blocks. The mounting blocks are also provided with screw holes, and fastening can be carried out by bolts. In other specific embodiments, the driving forks 13, 13' and the transmitting sleeve 11 can also be fixed by other connections. For example, the driving forks 13, 13' can be welded or bonded to the transmitting sleeve 11, or the driving forks 13, 13' and the transmitting sleeve 11 can be integrally molded.

Optionally, in a possible way of implementation, a lower end face of the first centering sleeve 12 is flush with a lower edge of the first through-hole.

Among them, the above scheme provides a possible implementation of the relative position relationship of the first centering sleeve 12 and the driving forks 13, 13', when the first centering sleeve 12 and the driving forks 13, 13' are in an unoperated state, or only when the driving forks 13, 13' are configured to sleeve on a screw cap. The above design allows protection of the first centering sleeve 12 and the first return spring 21 connected to it. At the same time, when adapting to a screw cap of another dimension (such as the above-mentioned second screw cap), the first centering sleeve 12 can be quickly sleeved on the screw cap, thereby improving the efficiency of the installation of the valve robot hand 10 on the ball valve.

It should be noted that the first return spring 21 is in a balanced state when the lower end face of the first centering sleeve 12 is flush with the lower edge of the first through-hole.

It should be noted that, in other specific embodiments, there is no limitation as to whether the lower end faces of the first centering sleeve 12 and driving forks 13, 13' are lying on the same plane. For example, the lower end face of the first centering sleeve 12 can also be in an inner cavity of the driving forks 13, 13'. This can protect the first centering sleeve 12 in the inner cavity of the driving forks 13, 13'.

Optionally, in a possible way of implementation, the first through-hole has a hole diameter smaller than an inner diameter of the transmitting sleeve 11. A first position-limiting step 120 is formed on an outer face of the first centering sleeve 12. The first position-limiting step 120 is configured to abut on an upper surface of the driving forks 13, 13' so as to limit the first centering sleeve 12 from detaching downward from the driving forks 13, 13'.

The above provides a design scheme that can limit the moving path of the first centering sleeve 12, wherein a portion of the upper surface of the driving forks 13, 13' can block a portion of the transmitting sleeve 11 by limiting the hole diameter of the first through-hole to be smaller than the inner diameter of the transmitting sleeve 11, thereby forming an annular blocking portion. A first position-limiting step 120 is formed on an outer face of the first centering sleeve 12, so that the first centering sleeve 12 leans on an upper surface of the driving forks 13, 13' (annular blocking portion) under action of the elastic force of the first return spring 21, thereby ensuring normal operation of the first centering sleeve 12.

It should be noted that, in other specific embodiments, the moving path of the first centering sleeve 12 can be limited by an inner wall design of the transmitting sleeve 11. For example, an annular abutting protrusion can be provided in the transmitting sleeve 11 to replace the annular blocking portion mentioned above.

Specifically, an annular projection is provided on the transmitting sleeve 11 close to an inner wall of one end of the driving fork 13, 13'. A through-hole formed on the annular projection has a hole diameter greater than or equal to the hole diameter of the first through-hole. A first position-limiting step is formed on an outer face of the first centering sleeve. The first position-limiting step is configured to abut on an upper surface of the annular projection so as to limit the first centering sleeve from detaching downward from the annular projection.

Figure 4:
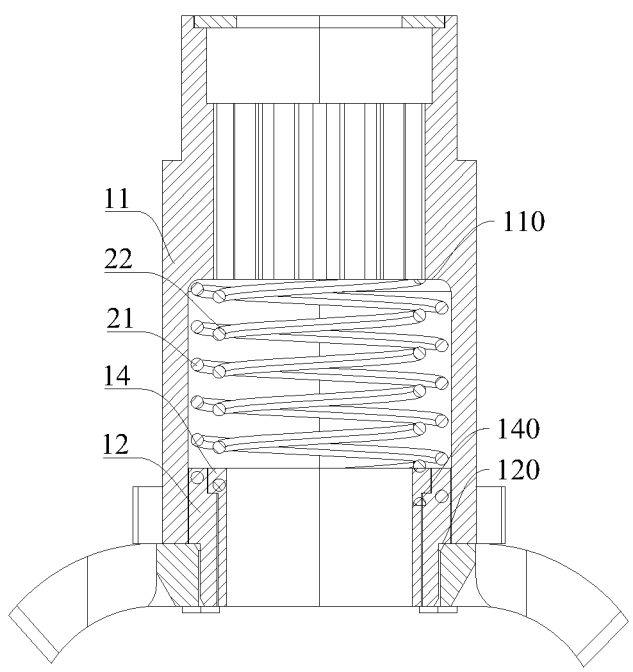
FIG. 4 is a structural schematic view, in a fourth perspective, of the first embodiment of the valve robot hand of the present application.

Optionally, in a possible way of implementation, as in FIG. 4, FIG. 4 shows a specific structure of the valve robot hand 10 of the present embodiment in a fourth perspective.

The valve robot hand 10 further includes a second return spring 22 and a second centering sleeve 14 configured to sleeve on the screw cap of the valve handle. The first centering sleeve 12 is sleeved on the second centering sleeve 14 so that the second centering sleeve 14 can move in the first centering sleeve 12 along its axial direction. The second return spring 22 is configured to exert a downward elastic force on the second centering sleeve 14.

Among them, valve robot hand 10 can also adapt to screw caps of another dimension, wherein the second centering sleeve 14 is configured to sleeve on another type of screw cap (wherein, in order to clearly describe and to follow the above description, the screw cap to be sleeved on by the second centering sleeves 14 is the third screw cap). Among them, the second centering sleeve 14 can slide in the first centering sleeve 12. At the same time, the first centering sleeve 12, the transmitting sleeve 11, and the driving fork 13 are coaxially disposed. Due to the presence of the second return spring 22, it allows the driving fork 13 and the first centering sleeve 12 to be able to properly sleeve on screw caps of different dimensions, while also ensuring normal operation of the second centering sleeve 14.

It should be noted that, as described above, the first centering sleeve 12 and the second centering sleeve 14 are consistent. In other specific embodiments, one can provide a third centering sleeve, a fourth centering sleeve, etc. with the cooperation of returnable structures in order to achieve the effect of adapting to a fourth type and a fifth type of screw caps.

Optionally, in a possible way of implementation, a second position-limiting step 140 is formed on an outer face of the second centering sleeve 14. As shown in FIG. 4, the second position-limiting step 140 is configured to abut on the first centering sleeve 12 so as to limit the second centering sleeve 14 from detaching downward from the first centering sleeve 12.

It should be noted that, in the present embodiment as shown in FIG. 4, an annular groove is provided on an inner wall of an upper end of the first centering sleeve 12. The groove is capable of leaning against and cooperating with the second position-limiting step 140 so that the second centering sleeve 14 is capable of abutting on the first centering sleeve 12. Moreover, it also avoids the influence of the second centering sleeve 14 on the first return spring 21. In other specific embodiments, the second position-limiting step 140 of the second centering sleeve 14 can also directly abut on an upper surface of the first centering sleeve 12. The second position-limiting step 140 is abutted on a portion of the upper surface of the first centering sleeve 12 to ensure that the first return spring 21 does not affect the second centering sleeve 14.

Among them, the moving path of the of the second centering sleeve 14 is limited through the abutment of the second position-limiting step 140 on the first centering sleeve 12. This makes the structure of the second centering sleeve 14 simple, effective and easy to manufacture, while ensuring normal operation of the second centering sleeve 14.

Further, as in FIG. 4, a third position-limiting step 110 is formed on an inner face of the transmitting sleeve 11. An upper end of the first return spring 21 abuts against the third position-limiting step 110. A lower end of the first return spring 21 abuts against an upper end face of the first centering sleeve 12. An upper end of the second return spring 22 abuts against the third position-limiting step 110. A lower end of the second return spring 22 abuts against an upper end face of the second centering sleeve 14.

Among them, in a possible way of installing the above first return spring 21 and second return spring 22, through the third position-limiting step 110 provided in the transmitting sleeve 11, the first return spring 21 and the second return spring 22 respectively abut between the third position-limiting step and the first centering sleeve 12 as well as the second centering sleeve 14. It is simple in structure, easy to manufacture and easy to promote. Moreover, due to the reasons of abutment, it is also easy to assemble and can save manufacturing costs.

In other specific embodiments, the upper ends of the first return spring 21 and the second return spring 22 can also be directly bonded or welded to the inner wall of the transmitting sleeve 11.

Figure 5:
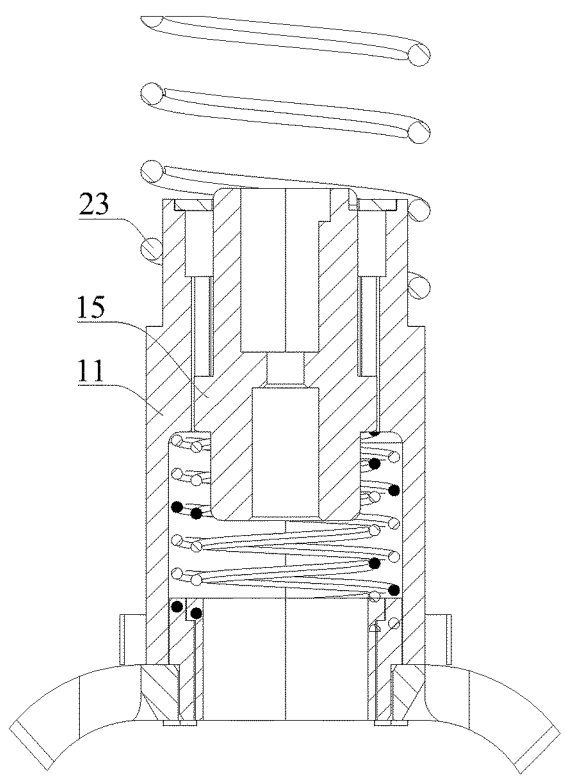
FIG. 5 is a structural schematic view, in a fifth perspective, of the first embodiment of the valve robot hand of the present application.

Optionally, referring to FIG. 5, FIG. 5 shows a specific structure of valve robot hand 10 of the present embodiment in a fifth perspective.

In a possible way of implementation, the valve robot hand 10 further includes a transmitting shaft 15 and a third return spring 23. An upper end of the transmitting sleeve 11 is sleeved on the transmitting shaft 15 and is connected with the transmitting shaft by a key. The transmitting shaft 15 is connected with an output end of the driving device 10a. The third return spring 23 is disposed between the transmitting sleeve 11 and the driving device 10a and is configured to exert a downward elastic force on the transmitting sleeve 11.

Among them, the transmitting sleeve 11 is connected with the transmitting shaft 15 by a key, so that the transmitting sleeve 11 can slide in an axial direction relative to the transmitting shaft 15. When the valve robot hand 10 is adapting to ball valves of different heights, screw caps of the ball valves of different heights can lean against the transmitting sleeve 11, allowing the transmitting sleeve 11 to shift upward in an axial direction. Moreover, due to the elastic force of the third return spring 23, the transmitting sleeve 11 can always abut on the upper surface of the screw cap, ensuring the stability of the transmitting sleeve 11 as well as the coaxiality of the screw cap.

It should be noted that, in the present embodiment, the specific structure of the transmitting sleeve 11 being connected with the transmitting shaft 15 by a key is that the inner wall of the transmitting sleeve 11 has an inner ring gear extending in an axial direction (as can be seen in FIG. 4). The outer wall of the transmitting shaft 15 is provided with external teeth, which can be slidably engaged with the inner ring gear.

Among them, it should be noted that a through-hole is provided on an upper end face of the transmitting shaft 15. An output shaft of the driving device 10a is inserted into the through-hole so that it is in transmission connection with the transmitting shaft 15. The transmitting shaft 15 and the output shaft of the driving device 10a are coaxially disposed.

Further, as in FIG. 3, the driving device 10a includes a motor 10a1, a decelerator 10a2 and a case body 10a3. The motor 10a1 and the decelerator 10a2 are arranged in the case body 10a3. An output end of the motor 10a1 is connected with an input end of the decelerator 10a2. An output end of the decelerator 10a2 extends out of the case body 10a3 and connects with the transmitting shaft 15. The third return spring 23 is sleeved on the transmitting sleeve 11. An upper end of the third return spring 23 is abutted against the case body 10*a*3. A lower end of the third return spring 23 is abutted against the transmitting sleeve 11.

It should be noted that an outer wall of the transmitting sleeve 11 is provided with a radially recessed step, and the step is capable of abutting against the third return spring 23. It should also be noted that, in other specific embodiments, the step on the outer wall of the transmitting sleeve 11 can also be provided with a pad, so that the third return spring 23 is abutted on the pad, thus protecting the appearance of the transmitting sleeve 11.

It should be noted that, as shown in FIG. 3 and FIG. 4, in order to meet the first specification of the valve handle screw cap, the first through-hole formed on the driving forks 13, 13' can be adapted to the first type of screw cap, and can sleeve on the valve handle screw cap of the first specification. Further, in order to meet the second specification of the valve handle screw cap, through the setting of the first centering sleeve 12 in the interior of the transmitting sleeve 11, the first centering sleeve 12 can adapt to (sleeve on) the second type of screw cap. Moreover, since the first centering sleeve 12 and the driving forks 13, 13' are in a sleeving relationship, the first centering sleeve 12 can move in an axial direction in the first through-hole as well as in the transmitting sleeve 11. Further, in order to meet the third specification of the valve handle screw cap, through the setting of the second centering sleeve 14 in the interior of the first centering sleeve 12, the second centering sleeve 14 can adapt to (sleeve on) the third type of screw cap. According to the above-mentioned structure, one can provide a third centering sleeve, a fourth centering sleeve, etc. in the interior of the second centering sleeve 14 with the cooperation of returnable structures in order to achieve the effect of adapting to a fourth type and a fifth type of screw caps. This will not be repeated here in detail.

Among them, in order to meet the largest specification of the valve handle screw cap, the hole diameter of the first through-hole formed on the driving forks 13, 13' needs to be able to adapt to the largest specification of the screw cap, so that it can sleeve on the valve handle screw cap of the largest specification, and then it can in turn reduce the hole diameter.

Further, please refer to FIG. 2 again.

In a possible way of implementation, the valve robot hand 10 further includes a clamping mechanism which is configured to be fixed on a pipe without the use of any tools for retrofit installation. The clamping mechanism is fixedly connected to the driving device 10*a*. The clamping mechanism includes two grippers 10*b*. The gripper 10*b* includes a first clamping piece 10*b*1, a second clamping piece 10*b*2, and an adjusting screw rod 10*b*3.

Figure 6:
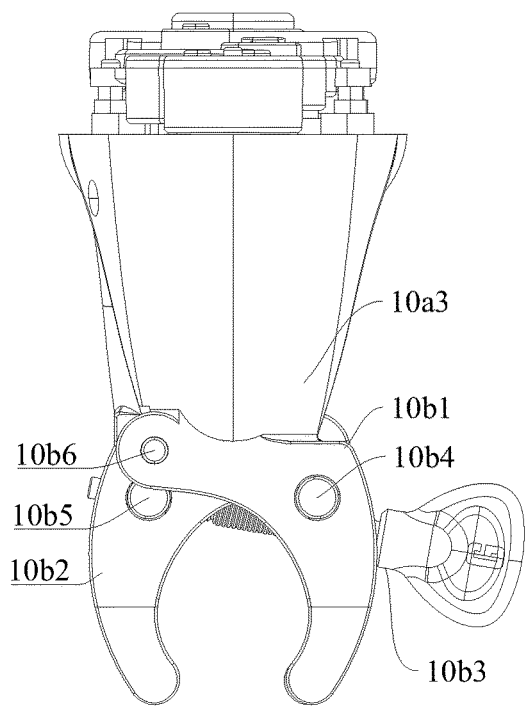
FIG. 6 is a structural schematic view of an embodiment of a gripper of the present application.

Among them, please refer to FIG. 6 which shows a specific structure of the gripper 10*b*.

An upper end of the first clamping piece 10*b*1 is provided with a hinge portion extending towards the second clamping piece 10*b*2. The hinge portion is hinged with an upper end of the second clamping piece 10*b*2. The first clamping piece 10*b*1 and the second clamping piece 10*b*2 together define a clamping space. An upper section of the first clamping piece 10*b*1 is provided with a first screw hole, and an upper section of the second clamping piece 10*b*2 is provided with a second screw hole. The adjusting screw rod 10*b*3 is in screw cooperation with the first screw hole and the second screw hole. Upper end faces of the two first clamping pieces 10*b*1 together secure the driving device 10*a*.

Among them, the above provides a possible way of implementation of fixing the driving device 10*a* to the pipe by a clamping mechanism, so that the driving device 10*a* can maintain a relative position relationship with the pipe, thereby enabling the valve robot hand 10 to stably couple with the ball valve. The clamping mechanism includes two grippers 10*b*. The driving device 10*a* is fixed on two sides of the pipe through the two grippers 10*b*, so that the driving device 10*a* is steadily secured. Specifically, the first clamping piece 10*b*1 and the second clamping piece 10*b*2 of the gripper 10*b* can realize clamping and releasing through the rotation of the adjusting screw rod 10*b*3, so that the first clamping piece 10*b*1 and the second clamping piece 10*b*2 can easily clamp on and release from the pipe without the use of any tools for retrofit installation on an existing pipe with a ball valve. The two grippers 10*b* on both sides of the ball valve can split and balance the counter force from the valve handle. This balancing mechanism can adapt to a large varieties of ball valves with different sizes and pipes with different diameters. The mechanism of the valve robot hand 10 can self-align the axis of the power output with the rotating axis of the valve handle by each drive action. This suggests that an easy, tool-free, and permanently reliable retrofit installation can be achieved. This balanced and self-aligned mechanism of the valve robot hand 10 can pave the way for much greater torque that can be applied to the valve handle without any issues.

It should be noted that, in other specific embodiments, the driving device 10*a* can be welded directly to the pipe in order to maintain the relative position relationship with the pipe. In other specific embodiments, the number of the grippers 10*b* in the clamping mechanism is not limited so long as it can achieve a stable clamping of the driving device 10*a*.

Further, referring to FIG. 6, the gripper 10*b* further includes a first assembly rod 10*b*4 and a second assembly rod 10*b*5, a center of the first assembly rod 10*b*4 is provided with a first screw hole, a center of the second assembly rod 10*b*5 is provided with a second screw hole.

The first assembly rod 10*b*4 is provided through the upper section of the first clamping piece 10*b*1. An outer wall of the first clamping piece 10*b*1 is provided with a through-hole. The first screw hole is exposed to the through-hole of the first clamping piece 10*b*1. The second assembly rod 10*b*5 is provided through the upper section of the second clamping piece 10*b*2. An outer wall of the second clamping piece 10*b*2 is provided with a through-hole. The second screw hole is exposed to the through-hole of the second clamping piece 10*b*2.

A front section of the adjusting screw rod 10*b*3 is formed into a first thread. A rear section of the adjusting screw rod 10*b*3 is formed into a second thread. A diameter of the first thread is smaller than a diameter of the second thread. The first thread and the second thread are left-handed thread and right-handed thread.

Among them, through the first assembly rod 10*b*4 and the second assembly rod 10*b*5, the first screw hole and the second screw hole in the gripper 10*b* are conveniently and simply realized, thereby effectively improving the efficiency of manufacturing and reducing the difficulty of manufacturing. Moreover, due to the application of left-handed and right-handed threads, it allows the adjusting screw rod 10*b*3 to quickly cooperate with the first screw hole and the second screw hole. This reduces the clamping and releasing time of the first clamping piece 10*b*1 and the second clamping piece 10*b*2 of the gripper 10*b*.

Among them, referring to FIG. 6, the gripper 10*b* further includes a hinge rod 10*b*6. The first clamping piece 10*b*1 and the second clamping piece 10*b*2 are two independent structures, and are assembled through the hinge rod 10*b*6, so as to realize the connecting and hinging of the first clamping piece 10*b*1 and the second clamping piece 10*b*2.

Among them, the hinge portion of the first clamping piece 10*b*1 is provided with a through-hole, and the upper end of the second clamping piece 10*b*2 is also provided with a through-hole. The hinge rod 10*b*6 is inserted into the through-hole at the hinge portion of the first clamping piece 10*b*1 and the through-hole at the upper end of the second clamping piece 10*b*2.

It should be noted that the valve robot hand 10 described in the present embodiment can be easily and steadily mounted on the pipe with two grippers 10*b*. At the same time, screw caps of different diameters can be adapted through the first centering sleeve 12, the second centering sleeve 14, the driving fork 13, the first return spring 21 and second return spring 22. Ball valves of different heights can be adapted through the transmitting shaft 15 and the cooperation of the sleeve of the transmitting shaft 15. Through the coaxial arrangement of the first centering sleeves 12, the second centering sleeve 14, the driving forks 13, 13', the transmitting shaft 15, and the sleeve of the transmitting shaft 15, the axis of the power output of the valve robot hand 10 in the present embodiment can be coaxial with the rotating axis of the handle of the valve.

Figure 7:
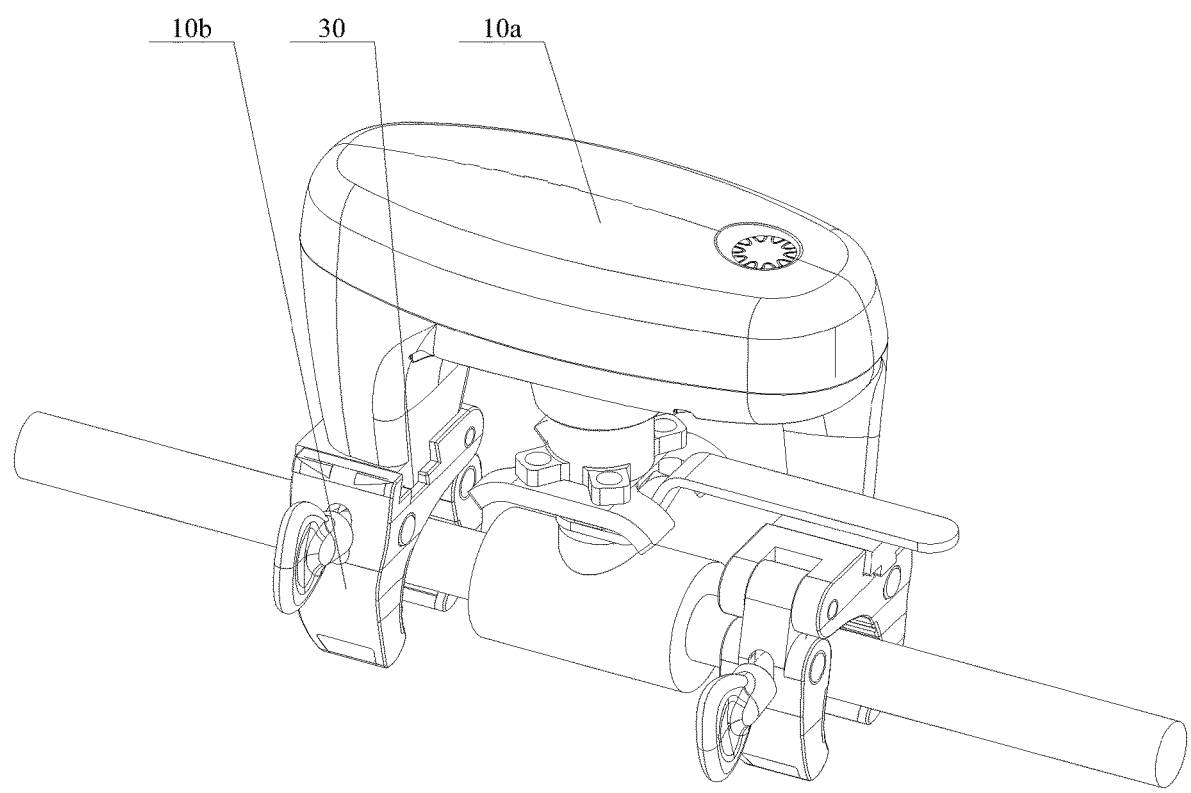
FIG. 7 is a structural schematic view of the first embodiment of the valve robot hand with a snap portion.
Figure 8:
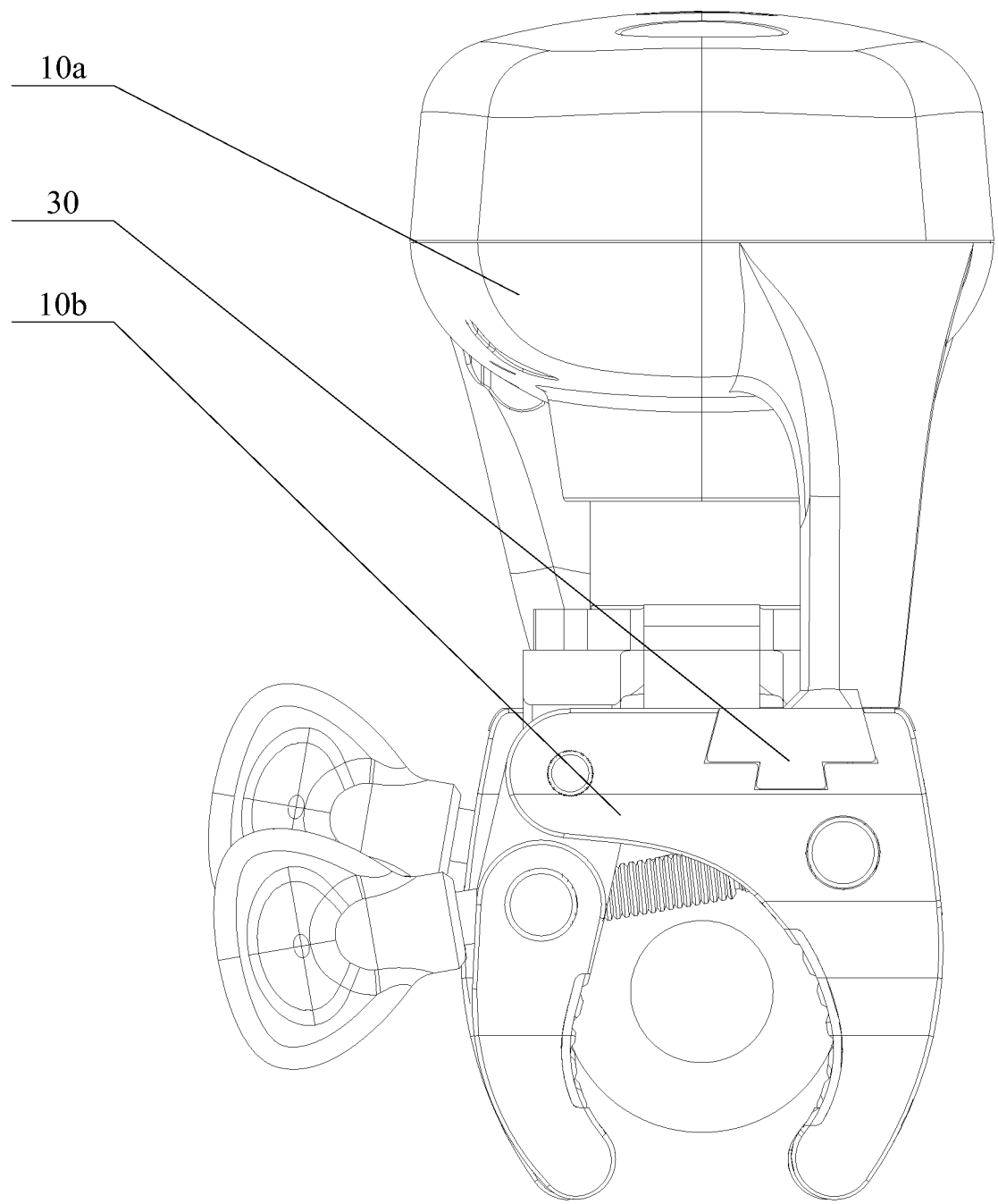
FIG. 8 is a side structural schematic view of the first embodiment of the valve robot hand of FIG. 7.
Figure 9:
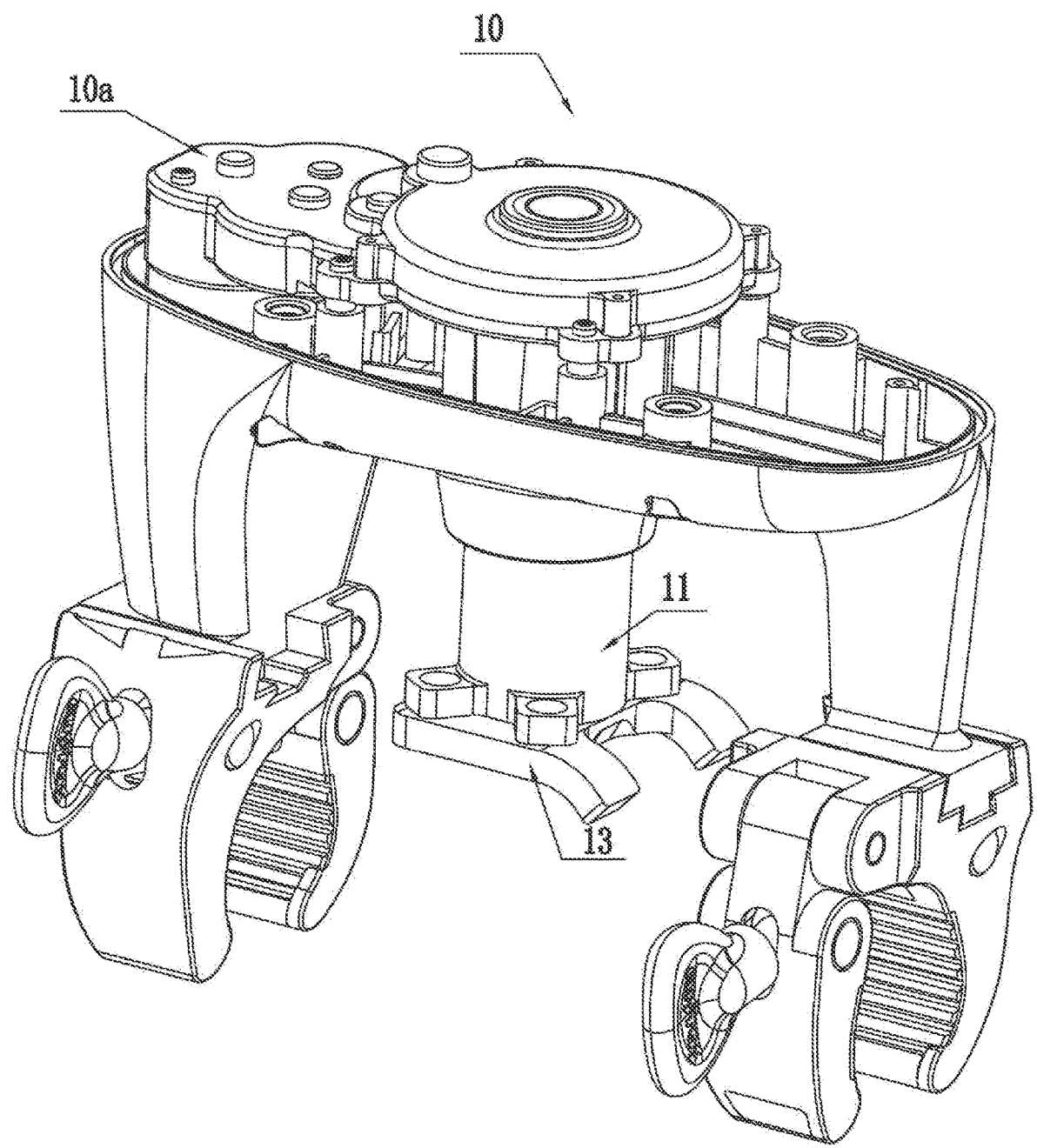
FIG. 9 is a structural schematic view, in a first perspective, of a second embodiment of the valve robot hand having only one driving fork.
Figure 10:
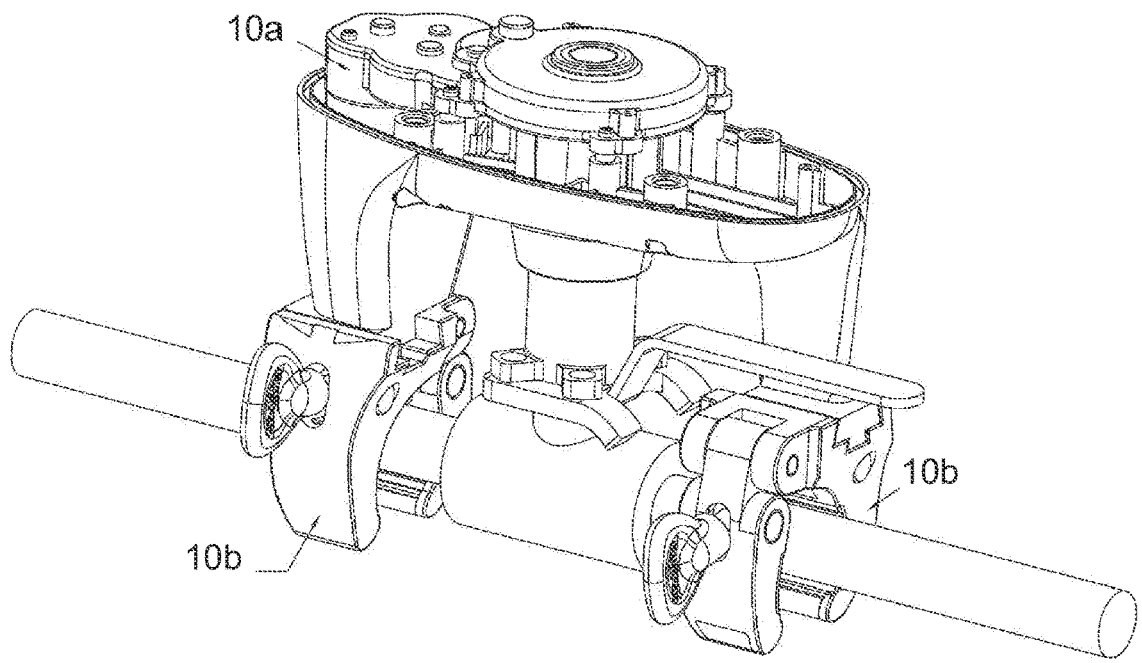
FIG. 10 is a structural schematic view, in a second perspective, of the second embodiment of the valve robot hand having only one driving fork.
Figure 11:
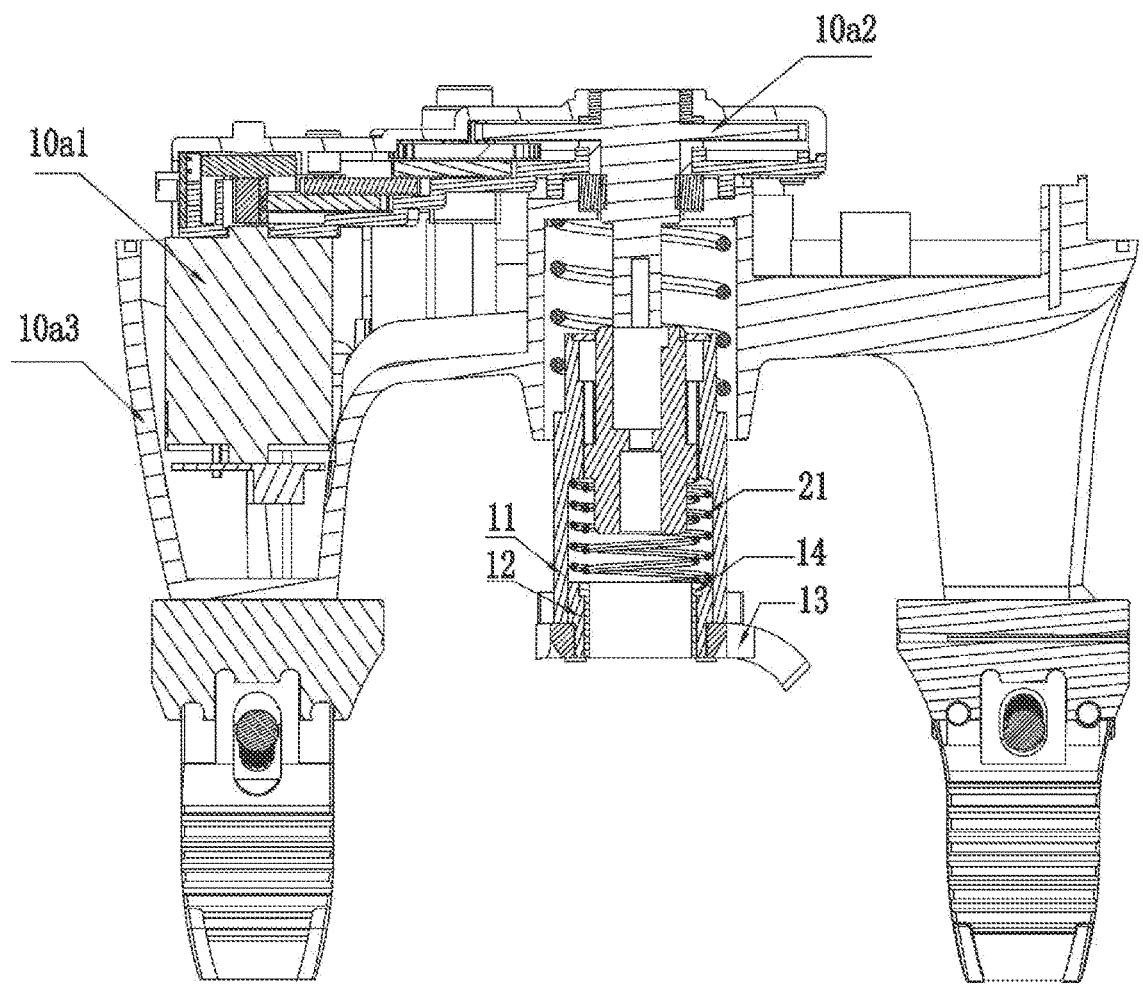
FIG. 11 is a structural schematic view, in a third perspective, of the second embodiment of the valve robot hand having only one driving fork.
Figure 12:
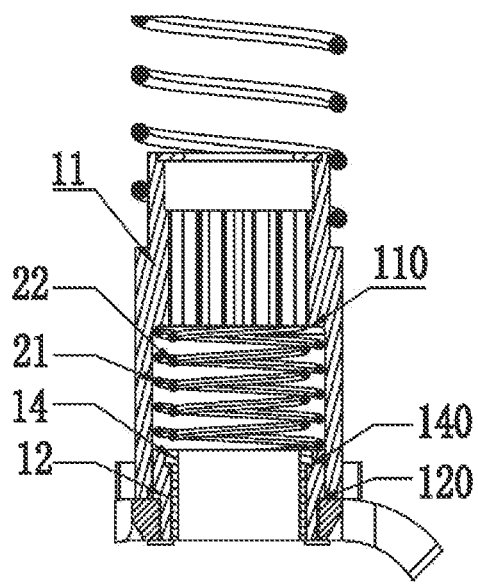
FIG. 12 is a structural schematic view, in a fourth perspective, of the second embodiment of the valve robot hand having only one driving fork.
Figure 13:
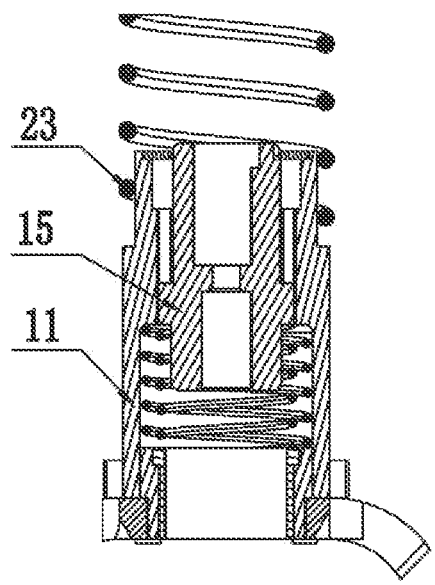
FIG. 13 is a structural schematic view, in a fifth perspective, of the second embodiment of the valve robot hand having only one driving fork.

As shown in FIG. 7 and FIG. 8, optionally, in a possible way of implementation, the valve robot hand further includes a clamping mechanism. The clamping mechanism is configured to be fixed on a pipe, and the clamping mechanism is connected with the driving device through a snap portion 30. The snap portion is provided with a sliding element. The sliding element of the snap portion is so configured that the clamping mechanism is capable of sliding relative to the driving device.

In the present embodiment, the clamping mechanism can be connected with the driving device using a snap portion. The snap portion is a snap portion including a wedge-shaped mating connection. Since the snap portion is provided with a sliding element, at the time of clamping the pipe, the clamping mechanism can carry out moderate adjustment according to the length of the pipe. This can more easily clamp the pipe and release the pipe.

Optionally, the clamping mechanism includes two grippers. The two grippers are correspondingly provided with two snap portions. The two grippers are capable of sliding relative to the driving device through the sliding elements of the snap portions so that the two grippers move towards each other or in opposite directions.

Among them, the valve robot hand 10 described in the present embodiment can be easily and steadily mounted on the pipe with two grippers 10*b*. Moreover, through the connection of the two grippers with the driving device through the snap portions, when the pipe is longer, the two grippers can be moved in opposite directions, so that the spacing between the two grippers is lengthened, and when the pipe is shorter, the two grippers can be moved towards each other, so that the spacing between the two grippers is shortened, so that the clamping mechanism can be more flexible for moderate adjustment according to the length of the pipe.

FIGS. 9-16 show a second embodiment of the electro mechanic valve servo apparatus or valve robot hand 10 of the present application. The structure of the valve robot hand of the second embodiment is basically the same as the structure of the valve robot hand of the first embodiment, except that the valve robot hand of the second embodiment has only one driving fork 13.

It can be seen that FIGS. 9-13 of the second embodiment are similar to FIGS. 1-5 of the first embodiment, except that FIGS. 1-5 show two driving forks 13, 13' disposed respectively on two opposite sides of the transmitting sleeve 11, whereas FIGS. 9-13 show only one fork 13 disposed on only one side of the transmitting sleeve 11.

Figure 14:
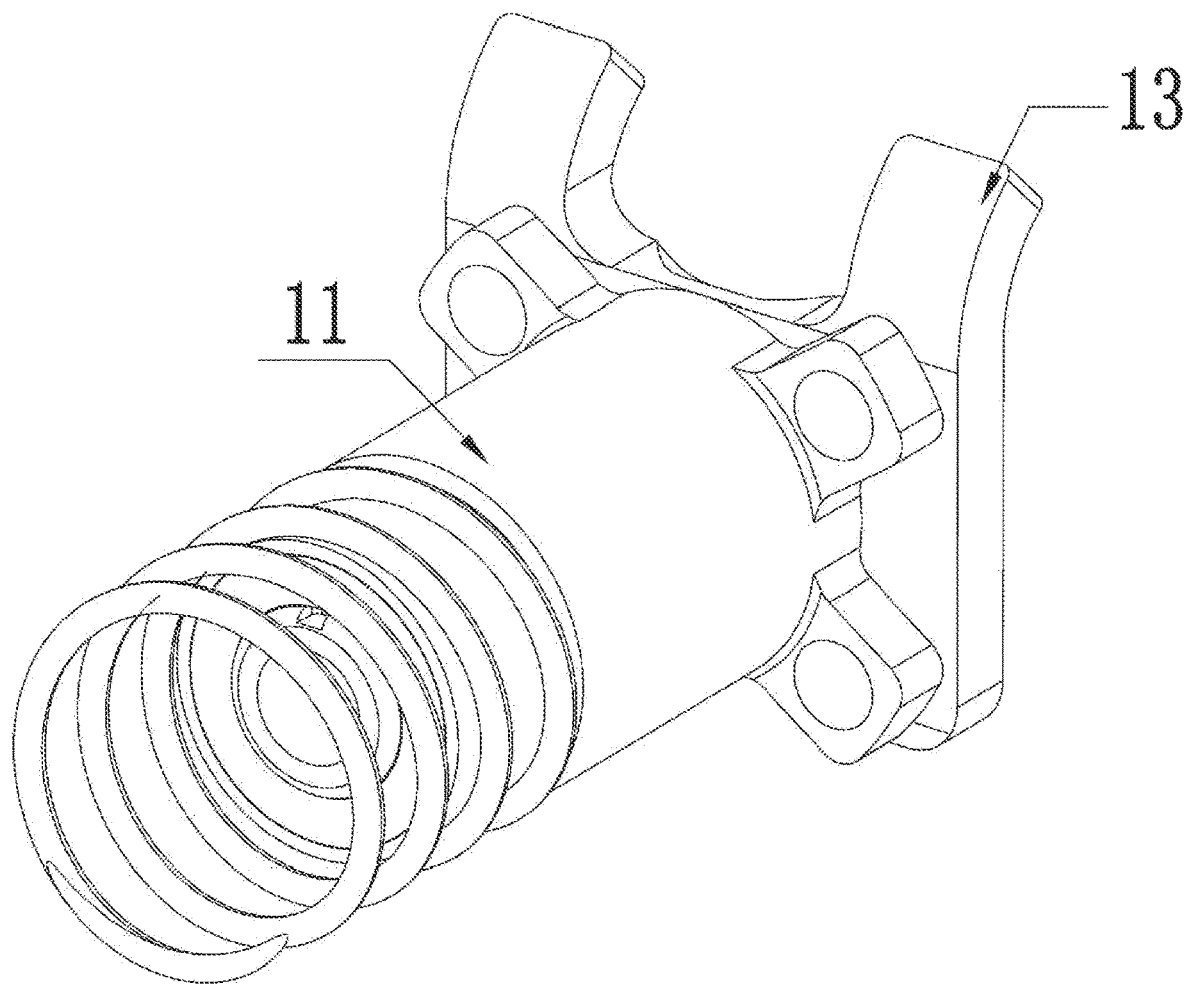
FIG. 14 is a top perspective view of an assembly of transmitting and centering sleeves of the second embodiment of the valve robot hand having only one driving fork.
Figure 15:
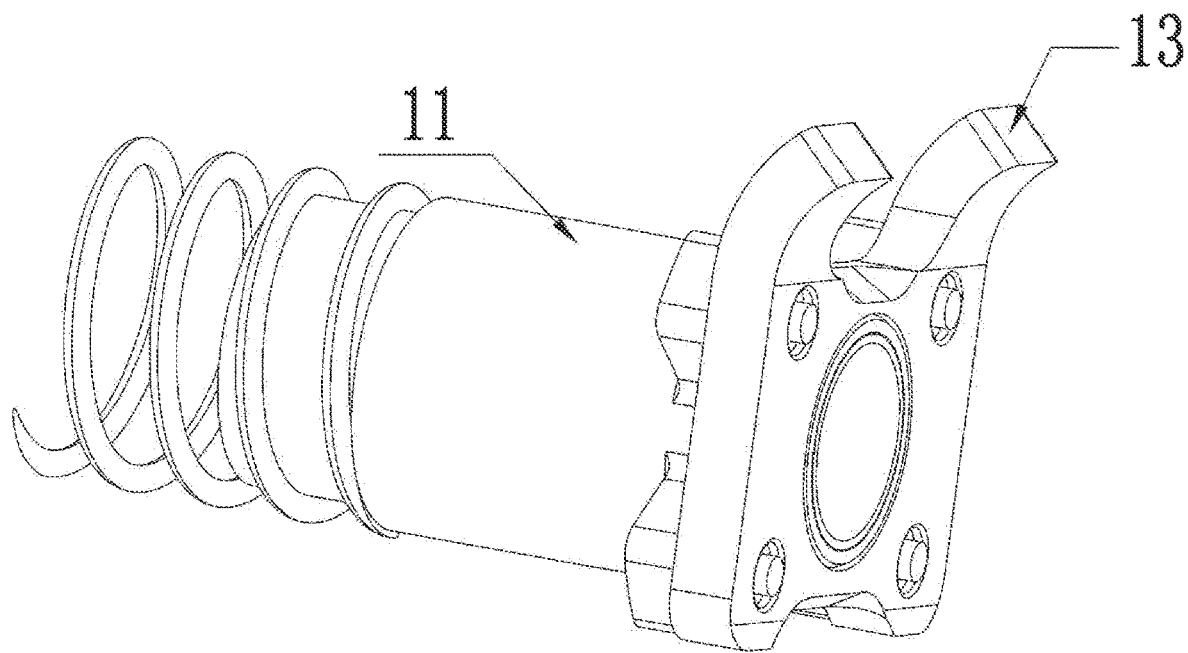
FIG. 15 is a bottom perspective view of the assembly of transmitting and centering sleeves of the second embodiment of the valve robot hand having only one driving fork.

FIGS. 14 and 15 show the top and bottom perspective views of an assembly of the transmitting and centering sleeves of the second embodiment of the valve robot hand having only one driving fork 13.

Figure 16:
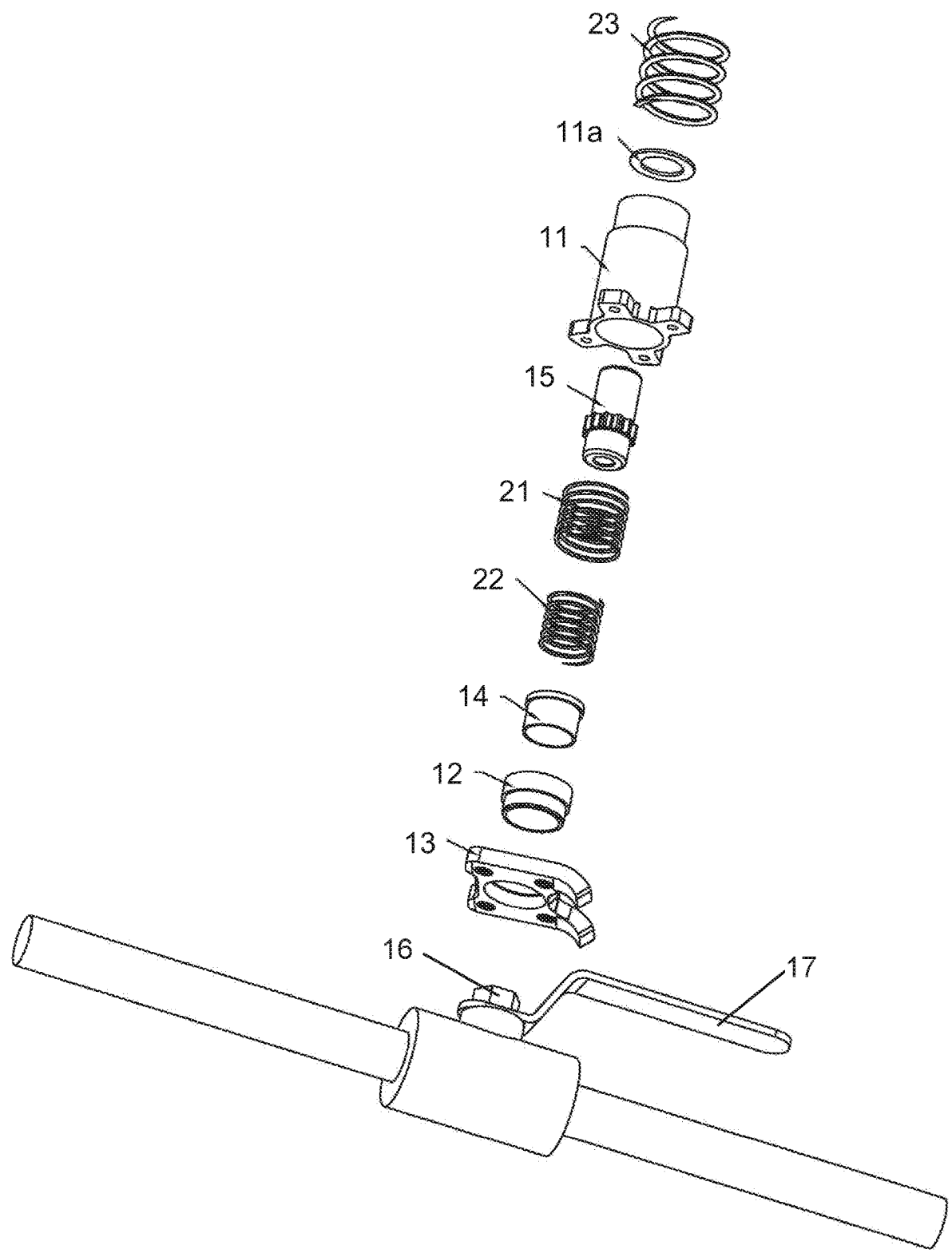
FIG. 16 is an exploded view of the components of the assembly of transmitting and centering sleeves of the second embodiment of the valve robot hand having only one driving fork.

FIG. 16 is an exploded view of the components of the assembly of the transmitting and centering sleeves of the second embodiment of the valve robot hand having only one driving fork 13. As shown in FIG. 16, the assembly includes transmitting sleeve 11, annular top cover 11*a* for covering a top end of the transmitting sleeve 11, first centering sleeve 12, second centering sleeve 14, transmitting shaft 15, first return spring 21, second return spring 22, third return spring 23, and only one driving fork 13 which is used to couple with and rotate the handle of a ball valve of a pipe.

FIGS. 17-24 show a third embodiment of the electro mechanic valve servo apparatus or valve robot hand 10 of the present application. The structure of the valve robot hand of the third embodiment is basically the same as the structure of the valve robot hand of the second embodiment, except that the driving fork 13 becomes a part of the transmitting sleeve 11.

Figure 17:
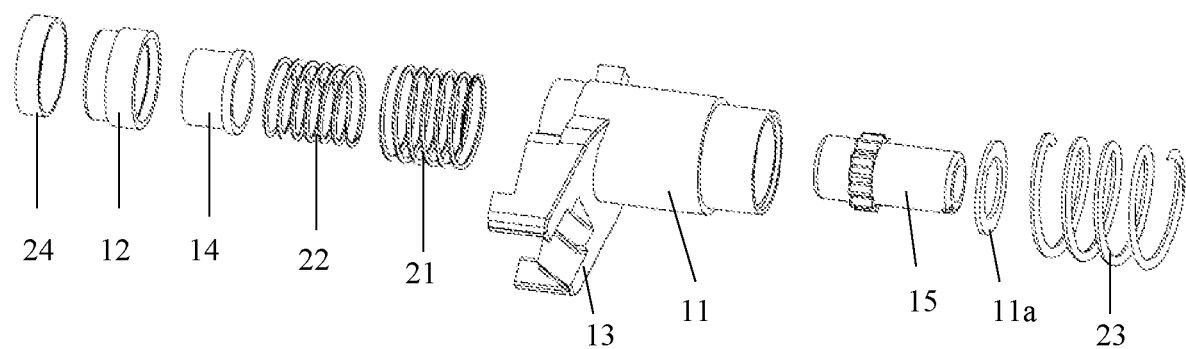
FIG. 17 is an exploded view of the components of the transmitting and centering sleeves of a third embodiment of the valve robot hand.
Figure 18:
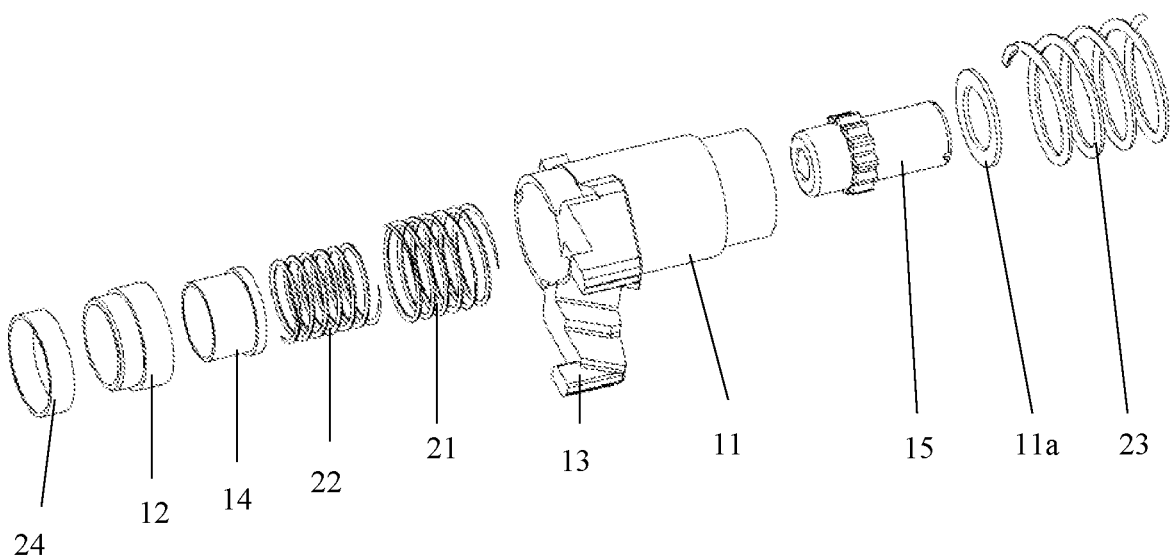
FIG. 18 is another exploded view of the components of the transmitting and centering sleeves of the third embodiment of the valve robot hand.

FIGS. 17 and 18 are two exploded views of the components of the transmitting and centering sleeves of the third embodiment of the valve robot hand. As shown in FIG. 17, the valve robot hand 10 includes a driving device 10*a* (see FIG. 9), a transmitting sleeve 11, a first return spring 21, a second return spring 22, a first centering sleeve 12 configured to sleeve on a screw cap 16 of a valve handle 17 (shown in FIG. 16), a second centering sleeve 14, a driving fork 13 configured to couple with the valve handle 17, and a ring-like stopper 24.

Figure 19:
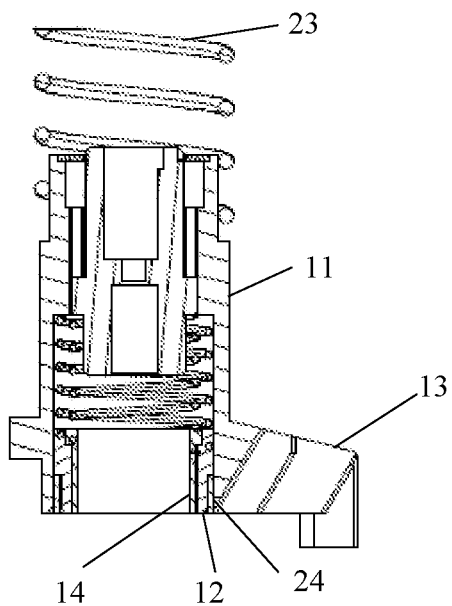
FIG. 19 is a cross sectional view of the third embodiment of the valve robot hand.
Figure 20:
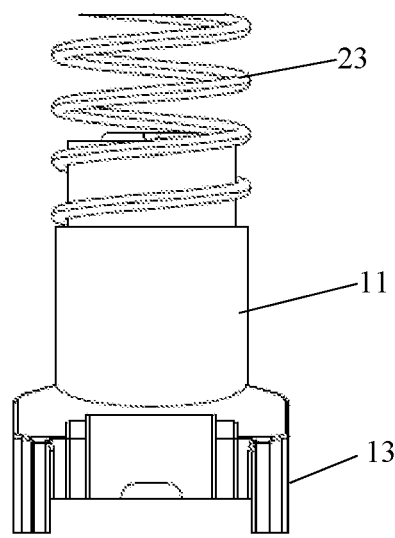
FIG. 20 is a front view of the third embodiment of the valve robot hand.
Figure 21:
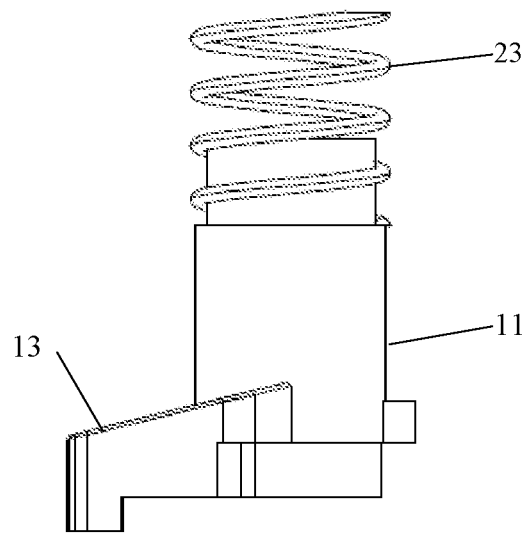
FIG. 21 is a side view of the third embodiment of the valve robot hand.
Figure 22:
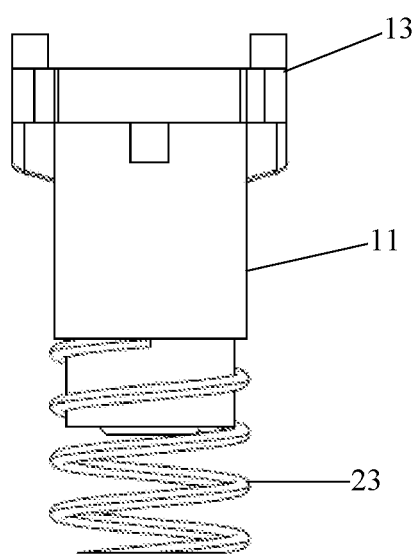
FIG. 22 is a rear view of the third embodiment of the valve robot hand.
Figure 23:
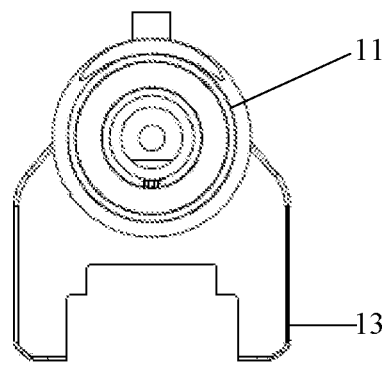
FIG. 23 is a top view of the third embodiment of the valve robot hand.
Figure 24:
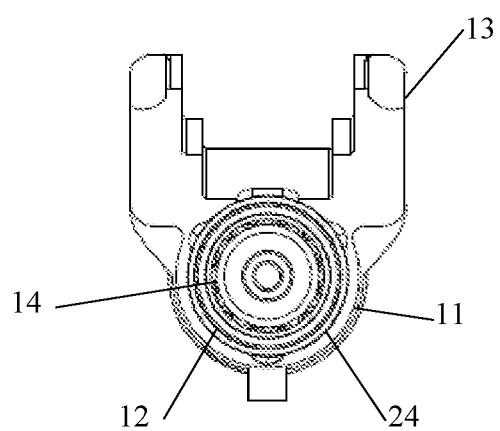
FIG. 24 is a bottom view of the third embodiment of the valve robot hand.

FIG. 19 is a cross sectional view of the third embodiment of the valve robot hand. It can be seen from FIG. 19 that the driving fork 13 is provided on an outer face of a lower end portion of the transmitting sleeve 11. The driving fork 13 may be integrally formed with the transmitting sleeve 11. The driving fork 13 may also be attached to the transmitting sleeve by welding or other conventional fastening means. The driving fork 13 can be sized and shaped to fit onto the valve handle 17. Although it has been shown that the valve robot hand of the third embodiment has only one driving fork 13, it is understood that the valve robot hand of the third embodiment may have two driving forks, as shown in the first embodiment, if needed.

As best illustrated in FIG. 19, the ring-like stopper 24 may be mounted on an inner face of the lower end portion of the transmitting sleeve 11. The ring-like stopper 24 is circular in shape and defines a first through-hole configured to sleeve on the screw cap 16 of the valve handle 17. The ring-like stopper 24 can be sleeved on the first centering sleeve 12 through the first through-hole such that the first centering sleeve 12 is capable of moving in the transmitting sleeve 11 along its axial direction. The ring-like stopper 24 may by mounted on the inner face of the lower end portion of the transmitting sleeve 11 by welding, threading, interference-fitting, friction-fitting, shrink-fitting, or any other appropriate method.

Similar to the first and second embodiments, the first return spring 21 is configured to exert a downward elastic force on the first centering sleeve 12. The driving device 10*a* is in transmission connection with an upper end of the transmitting sleeve 11 so as to drive the transmitting sleeve 11 and the driving fork 13 to rotate.

It can also be seen in FIG. 19 that a lower end face of the first centering sleeve 12 is in flush with a lower end face of the ring-like stopper 24. Furthermore, the lower end faces of the first centering sleeve 12 and the ring-like stopper 24 may also flush with a lower end face of the transmitting sleeve 11 and a lower end face of a portion of the driving fork 13. This can facilitate operation of the valve robot hand and protect the first centering sleeve 12 and the ring-like stopper 24 from being damaged during operation.

Similar to the second embodiment, a first position-limiting step 120 may be formed on an outer face of the first centering sleeve 12. The first position-limiting step 120 is configured to abut on an upper surface of the ring-like stopper 24, so as to limit the first centering sleeve 12 from detaching downward from the transmitting sleeve 11.

The structure of the valve robot hand of the third embodiment can make it easier to install and hold the first and second centering sleeves 12, 14 as well as the first and second return springs 21, 22 in the transmitting sleeve 11, without using four bolts to fasten a separate driving fork to the lower end of the transmitting sleeve, as required in the first and second embodiments. It can also make it easier to detach the first and second centering sleeves 12, 14 as well as the first and second return springs 21, 22 from the transmitting sleeve 11 for replacement and maintenance. Since the driving fork 13 and the transmitting sleeve 11 are formed into one piece, without the need of bolts which may become loose, the valve robot hand of the third embodiment is sturdy and more durable, and hence less maintenance and labor are required.

Although it has been shown in the third embodiment of the valve robot hand that various components of the valve robot hand are circular in shape, it is understood by a person skilled in the art that various components of the valve robot hand may be in other possible shape, such as a square, rectangle, pentagon, hexagon, octagon, or other polygonal shapes.

FIGS. 25-28 shows a fourth embodiment of the valve robot hand of the present application. The structure of the fourth embodiment of the valve robot hand is the same as the structure of the third embodiment, except that various components of the valve robot hand of the fourth embodiment are hexagonal in shape, instead of circular.

Figure 25:
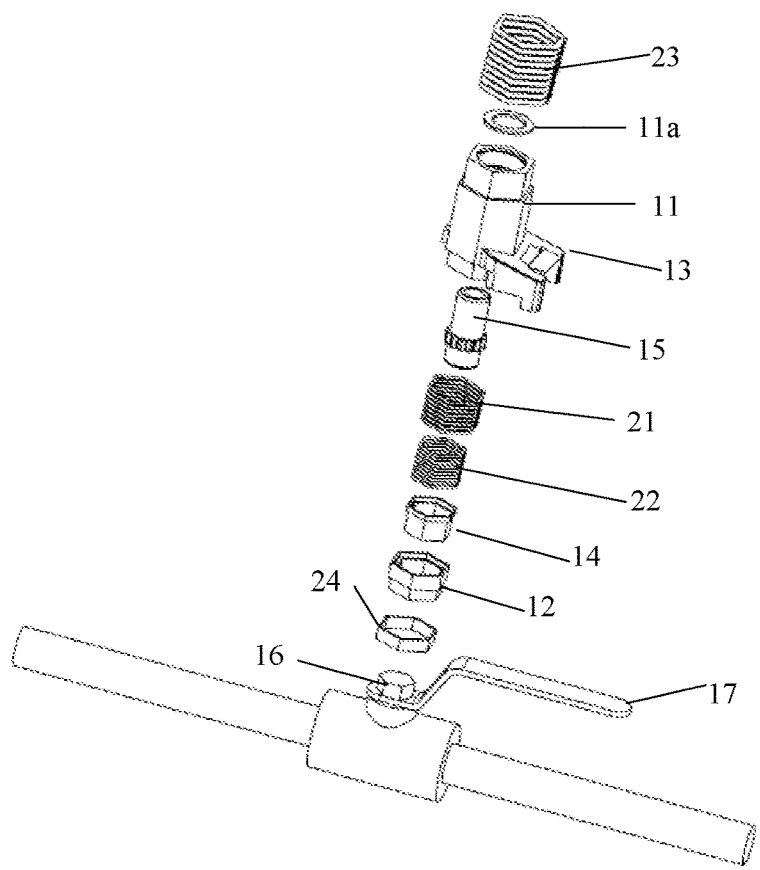
FIG. 25 is an exploded view of the components of the transmitting and centering sleeves of a fourth embodiment of the valve robot hand.
Figure 26:
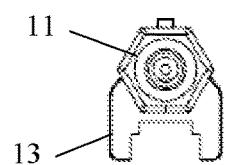
FIG. 26 is a top view of the fourth embodiment of the valve robot hand.
Figure 27:
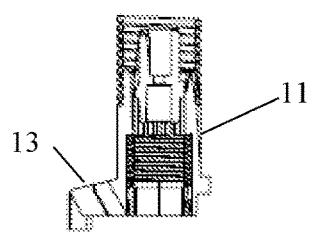
FIG. 27 is a cross sectional view of the fourth embodiment of the valve robot hand.
Figure 28:
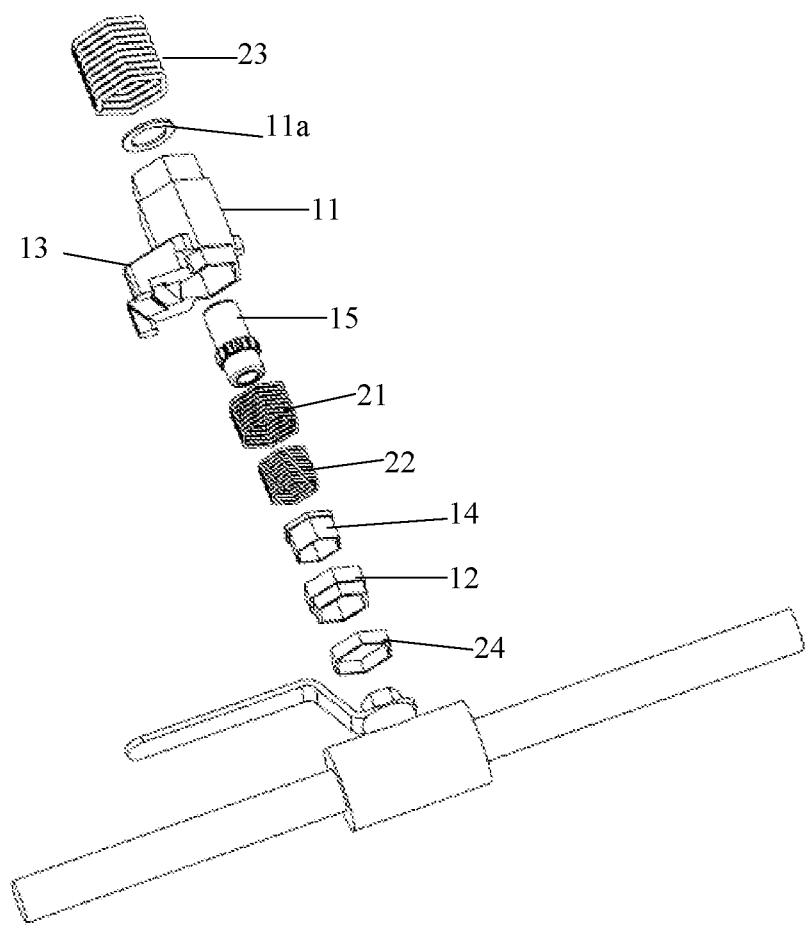
FIG. 28 is another exploded view of the components of the transmitting and centering sleeves of the fourth embodiment of the valve robot hand.

FIG. 25 is an exploded view of the components of the transmitting and centering sleeves of the fourth embodiment of the valve robot hand. It can be seen from FIG. 25 that the transmitting sleeve 11, the first centering sleeve 12, the second centering sleeve 14, the first return spring 21, the second return spring 22, the third return spring 23, and the ring-like stopper 24 have a cross sectional shape of a hexagon. It is understood that this hexagonal structure of the first centering sleeve 12 and the second centering sleeve 14 can be adapted to engage with a hexagonal screw cap 16 of various sizes.

The above are only preferred embodiments of the present application, and are not used to limit the present disclosure. For a technical person skilled in the art, the present disclosure may have various modifications and changes. Any modification, substitution, improvement, etc. made within the spirit and principles of the present disclosure shall be included in the scope of protection of the present disclosure.

INDUSTRIAL PRACTICALITY

The valve robot hand provided in the embodiments of the present application can adapt to screw caps of different diameters and can adapt to ball valves of different heights. The axis of the power output is coaxial with the rotating axis of the handle of the valve, so that the valve robot hand can adapt to ball valves of a variety of specifications.

What is claimed is:

1. A valve robot hand, comprising:
a driving device, a transmitting sleeve, a first return spring, a first centering sleeve configured to sleeve on a screw cap of a valve handle, a driving fork configured to couple with the valve handle, and a ring shaped stopper;
wherein the driving fork is provided on an outer face of a lower end portion of the transmitting sleeve, the ring-shaped stopper is mounted on an inner face of the lower end portion of the transmitting sleeve, the ring-shaped stopper defines a first through-hole configured to sleeve on the screw cap of the valve handle, the ring-shaped stopper is sleeved on the first centering sleeve through the first through-hole such that the first centering sleeve is capable of moving in the transmitting sleeve along its axial direction;
the first return spring is configured to exert a downward elastic force on the first centering sleeve, the driving device is in transmission connection with an upper end of the transmitting sleeve, so as to drive the transmitting sleeve and the driving fork to rotate;
wherein a lower end face of the first centering sleeve is in flush with a lower end face of the ring shaped stopper;
wherein the driving fork is integrally formed with the transmitting sleeve.

2. The valve robot hand according to claim 1, wherein the transmitting sleeve, the first centering sleeve, the first return spring, and the ring-shaped stopper have a cross sectional shape selected from a group consisting of a circle, square, rectangle, pentagon, hexagon, octagon, and polygon.

3. The valve robot hand according to claim 1, wherein a first position-limiting step is formed on an outer face of the first centering sleeve, the first position-limiting step is configured to abut on an upper surface of the ring shaped stopper, so as to limit the first centering sleeve from detaching downward from the transmitting sleeve.

4. The valve robot hand according to claim 1, wherein, the valve robot hand further comprises a clamping mechanism, the clamping mechanism is configured to be secured to a pipe, and the clamping mechanism is connected with the driving device through a snap portion;
the snap portion is provided with a sliding element, the sliding element of the snap portion is so configured that the clamping mechanism is capable of sliding relative to the driving device.

5. The valve robot hand according to claim 4, wherein the clamping mechanism comprises two grippers, the two grippers are correspondingly provided with two snap portions, the two grippers are capable of sliding relative to the driving device through the sliding elements of the snap portions, so that the two grippers move towards each other or in opposite directions.

6. A valve robot hand, comprising:
a driving device, a transmitting sleeve, a first return spring, a first centering sleeve configured to sleeve on a screw cap of a valve handle, a driving fork configured to couple with the valve handle, and a ring-shaped stopper;
wherein the driving fork is provided on an outer face of a lower end portion of the transmitting sleeve, the ring-shaped stopper is mounted on an inner face of the lower end portion of the transmitting sleeve, the ring shaped stopper defines a first through-hole configured to sleeve on the screw cap of the valve handle, the ring shaped stopper is sleeved on the first centering sleeve through the first through-hole such that the first centering sleeve is capable of moving in the transmitting sleeve along its axial direction;

the first return spring is configured to exert a downward elastic force on the first centering sleeve, the driving device is in transmission connection with an upper end of the transmitting sleeve, so as to drive the transmitting sleeve and the driving fork to rotate;

wherein the valve robot hand further comprises a second return spring and a second centering sleeve configured to sleeve on the screw cap of the valve handle, the first centering sleeve is sleeved on the second centering sleeve so that the second centering sleeve is movable in the first centering sleeve along its axial direction; and the second return spring being configured to exert a downward elastic force on the second centering sleeve;

wherein the driving fork is integrally formed with the transmitting sleeve.

7. The valve robot hand according to claim 6, wherein the transmitting sleeve, the first centering sleeve, the second centering sleeve, the first return spring, the second return spring, and the ring-shaped stopper have a cross sectional shape selected from a group consisting of a circle, square, rectangle, pentagon, hexagon, octagon, and polygon.

8. The valve robot hand according to claim 6, wherein the first centering sleeve, the second centering sleeve, the transmitting sleeve and the ring-shaped stopper are coaxially disposed.

9. The valve robot hand according to claim 8, wherein a second position-limiting step is formed on an outer face of the second centering sleeve, the second position-limiting step is configured to abut on the first centering sleeve, so as to limit the second centering sleeve from detaching downward from the first centering sleeve.

10. The valve robot hand according to claim 9, wherein an annular groove is provided on an inner wall of an upper end of the first centering sleeve, the groove is capable of leaning against and cooperating with the second position-limiting step, so that the second centering sleeve is capable of abutting on the first centering sleeve.

11. The valve robot hand according to claim 6, wherein a third position-limiting step is formed on an inner face of the transmitting sleeve, an upper end of the first return spring is abutted against the third position-limiting step, a lower end of the first return spring is abutted against an upper end face of the first centering sleeve, an upper end of the second return spring is abutted against the third position-limiting step, a lower end of the second return spring is abutted against an upper end face of the second centering sleeve.

12. The valve robot hand according to claim 6, wherein the valve robot hand further comprises a transmitting shaft and a third return spring, the upper end of the transmitting sleeve is sleeved on the transmitting shaft and is connected with the transmitting shaft by a key, the transmitting shaft is connected with an output end of the driving device, the third return spring is disposed between the transmitting sleeve and the driving device and is configured to exert a downward elastic force on the transmitting sleeve; and wherein a through-hole is provided on an upper end face of the transmitting shaft, an output shaft of the driving device is inserted into the through-hole of the transmitting shaft and is configured to be in transmission connection with the transmitting shaft, the transmitting shaft and the output shaft of the driving device are coaxially disposed.

13. The valve robot hand according to claim 12, wherein the driving device comprises a motor, a decelerator and a case body, the motor and the decelerator are arranged in the case body, an output end of the motor is connected with an input end of the decelerator, an output end of the decelerator extends out of the case body and connects with the transmitting shaft, the third return spring is sleeved on the transmitting sleeve, an upper end of the third return spring is abutted against the case body, a lower end of the third return spring is abutted against the transmitting sleeve; and wherein an outer wall of the transmitting sleeve is provided with a radially recessed step, and the step is capable of abutting against the third return spring.

14. A valve robot hand, comprising:

a driving device, a transmitting sleeve, a first return spring, a first centering sleeve configured to sleeve on a screw cap of a valve handle, a driving fork configured to couple with the valve handle, and a ring-shaped stopper;

wherein the driving fork is provided on an outer face of a lower end portion of the transmitting sleeve, the ring-shaped stopper is mounted on an inner face of the lower end portion of the transmitting sleeve, the ring shaped stopper defines a first through-hole configured to sleeve on the screw cap of the valve handle, the ring-shaped stopper is sleeved on the first centering sleeve through the first through-hole such that the first centering sleeve is capable of moving in the transmitting sleeve along its axial direction;

the first return spring is configured to exert a downward elastic force on the first centering sleeve, the driving device is in transmission connection with an upper end of the transmitting sleeve, so as to drive the transmitting sleeve and the driving fork to rotate;

wherein the valve robot hand further comprises a clamping mechanism which is configured to be secured to a pipe, the clamping mechanism is fixedly connected to the driving device;

the clamping mechanism comprising two grippers, the gripper comprising a first clamping piece, a second clamping piece, and an adjusting screw rod;

an upper end of the first clamping piece is provided with a hinge portion extending towards the second clamping piece, the hinge portion is hinged with an upper end of the second clamping piece, the first clamping piece and the second clamping piece together define a clamping space, an upper section of the first clamping piece is provided with a first screw hole, an upper section of the second clamping piece is provided with a second screw hole, the adjusting screw rod is in screw cooperation with the first screw hole and the second screw hole; and upper end faces of the two first clamping pieces together secure the driving device;

wherein the driving fork is integrally formed with the transmitting sleeve.

15. The valve robot hand according to claim 14, wherein the transmitting sleeve, the first centering sleeve, the first return spring, and the ring shaped stopper have a cross sectional shape selected from a group consisting of a circle, square, rectangle, pentagon, hexagon, octagon, and polygon.

16. The valve robot hand according to claim 14, wherein, the gripper further comprises a first assembly rod and a second assembly rod, a center of the first assembly rod is provided with a first screw hole, a center of the second assembly rod is provided with a second screw hole;

the first assembly rod is provided through the upper section of the first clamping piece, an outer wall of the first clamping piece is provided with a through-hole, the first screw hole is exposed to the through-hole of the first clamping piece, the second assembly rod is provided through the upper section of the second clamping piece, an outer wall of the second clamping piece is provided with a through-hole, the second screw hole is exposed to the through-hole of the second clamping piece;

a front section of the adjusting screw rod is formed into a first thread, a rear section of the adjusting screw rod is formed into a second thread, a diameter of the first thread is smaller than a diameter of the second thread, the first thread and the second thread are left-handed thread and right-handed thread.

17. The valve robot hand according to claim 16, wherein the gripper further comprises a hinge rod, the first clamping piece and the second clamping piece are assembled through the hinge rod; and wherein the hinge portion of the first clamping piece is provided with a through-hole, and the upper end of the second clamping piece is also provided with a through-hole, the hinge rod is inserted into the through-hole at the hinge portion of the first clamping piece and the through-hole at the upper end of the second clamping piece.

* * * * *